(12) United States Patent
Donnelly et al.

(10) Patent No.: US 7,906,862 B2
(45) Date of Patent: Mar. 15, 2011

(54) MULTIPLE PRIME POWER SOURCE LOCOMOTIVE CONTROL

(75) Inventors: Frank Donnelly, North Vancouver (CA); Andrew Tarnow, Cambridge Springs, PA (US); Bruce Wolff, Vancouver (CA); John Watson, Evergreen, CO (US)

(73) Assignee: Railpower, LLC, Nicholasville, KY (US)

( * ) Notice: Subject to any disclaimer, the term of this patent is extended or adjusted under 35 U.S.C. 154(b) by 511 days.

(21) Appl. No.: 11/912,389

(22) PCT Filed: Apr. 25, 2006

(86) PCT No.: PCT/US2006/015778
§ 371 (c)(1),
(2), (4) Date: Aug. 20, 2008

(87) PCT Pub. No.: WO2006/116479
PCT Pub. Date: Nov. 2, 2006

(65) Prior Publication Data
US 2008/0296970 A1    Dec. 4, 2008

Related U.S. Application Data

(60) Provisional application No. 60/674,837, filed on Apr. 25, 2005, provisional application No. 60/692,400, filed on Jun. 20, 2005, provisional application No. 60/753,444, filed on Dec. 22, 2005.

(51) Int. Cl.
*H02P 1/54*    (2006.01)

(52) U.S. Cl. ............. 290/6; 290/40 C; 318/105; 307/9.1

(58) Field of Classification Search .................. 290/4 R, 290/40 C; 318/108
See application file for complete search history.

(56) References Cited

U.S. PATENT DOCUMENTS

| | | | | |
|---|---|---|---|---|
| 1,802,184 | A * | 4/1931 | Pollock | 440/1 |
| 6,150,731 | A * | 11/2000 | Rinaldi et al. | 290/1 A |
| 6,175,163 | B1 * | 1/2001 | Rinaldi et al. | 290/6 |
| 6,188,139 | B1 * | 2/2001 | Thaxton et al. | 290/4 R |
| 6,308,639 | B1 | 10/2001 | Donnelly | |
| 6,591,758 | B2 | 7/2003 | Kumar | |
| 6,612,245 | B2 * | 9/2003 | Kumar et al. | 105/26.05 |
| 6,919,711 | B2 * | 7/2005 | Haydock et al. | 322/24 |

(Continued)

FOREIGN PATENT DOCUMENTS

JP       10191505       7/1998

(Continued)

OTHER PUBLICATIONS

U.S. Appl. No. 11/201,267, filed Aug. 9, 2005, Donnelly.

*Primary Examiner* — Joseph Waks
(74) *Attorney, Agent, or Firm* — King & Schickli, PLLC

(57) ABSTRACT

A control strategy for operating a plurality of prime power sources during propulsion, idling and braking and is applicable to large systems such as trucks, ships, cranes and locomotives utilizing diesel engines, gas turbine engines, other types of internal combustion engines, fuel cells or combinations of these that require substantial power and low emissions utilizing multiple power plant combinations. It is directed at a general control strategy for multi-engine systems where the power systems need not be of the same type or power rating and may even use different fuels. It is based on a common DC bus electrical architecture so that prime power sources need not be synchronized.

36 Claims, 17 Drawing Sheets

U.S. PATENT DOCUMENTS

| | | | | |
|---|---|---|---|---|
| 6,922,619 | B2 * | 7/2005 | Baig et al. | 701/20 |
| 6,984,946 | B2 * | 1/2006 | Donnelly et al. | 318/139 |
| 7,124,691 | B2 * | 10/2006 | Donnelly et al. | 105/26.05 |
| 7,304,445 | B2 | 12/2007 | Donnelly | |
| 7,514,807 | B2 * | 4/2009 | Donnelly et al. | 290/40 C |
| 7,518,254 | B2 * | 4/2009 | Donnelly et al. | 290/40 C |
| 7,565,867 | B2 * | 7/2009 | Donnelly et al. | 105/62.1 |
| 7,595,597 | B2 * | 9/2009 | King et al. | 318/139 |
| 7,667,347 | B2 * | 2/2010 | Donnelly et al. | 307/10.1 |
| 7,723,932 | B2 * | 5/2010 | King et al. | 318/139 |
| 2003/0104899 | A1 | 6/2003 | Keller | |
| 2004/0216636 | A1 | 11/2004 | Emori | |
| 2006/0061307 | A1 * | 3/2006 | Donnelly | 318/108 |
| 2006/0091832 | A1 | 5/2006 | Donnelly | |
| 2006/0266256 | A1 | 11/2006 | Donnelly | |
| 2009/0314179 | A1 * | 12/2009 | Kumar | 105/35 |
| 2010/0106343 | A1 * | 4/2010 | Donnelly et al. | 700/295 |

FOREIGN PATENT DOCUMENTS

WO    WO-03/072388    9/2003

* cited by examiner

MULTIPLE PRIME POWER SOURCE LOCOMOTIVE CONTROL

FIELD

The present invention relates generally to means of control a locomotive comprising a plurality of prime power sources, fuel types and drive train combinations.

BACKGROUND

Railroads are under increasing pressure to reduce emissions and to increase fuel efficiency. One of several responses to these forces has been the development of hybrid locomotives. Donnelly has disclosed the use of a battery-dominant hybrid locomotive in U.S. Pat. No. 6,308,639 which is incorporated herein by reference. Hybrid locomotives can reduce emissions and fuel consumption in rail operations such as yard switching but they are less effective for medium haul freight or commuter trains.

In U.S. patent application Ser. No. 11/200,88 filed Aug. 19, 2005 entitled "Locomotive Power Train Architecture", Donnelly et al. have further disclosed a general electrical architecture for locomotives based on plurality of power sources, fuel and drive train combinations. The power sources may be any combination of engines, fuel cells, energy storage and regenerative braking. This application is also incorporated herein by reference.

Multi-engine locomotives are not new and a number of configurations have been built over the years. Examples are the Baldwin locomotives built in the 1940s and, more recently, a dual engine locomotive built by the French Railway Company, VFLI. In U.S. patent application Ser. No. 11/201,267 filed Aug. 9, 2005 entitled "Multiple Engine Locomotive Configuration", Donnelly et al. have disclosed a means of packaging engine modules on a multi-engine locomotive that optimizes the power density of the locomotive power plants while reducing emissions and fuel consumption.

There remains a need for a versatile control strategy for multi-prime power source vehicles such as locomotives with an appropriate control strategy that can reduce emissions and fuel consumption over the entire spectrum of railroad applications and does not have to rely on energy storage systems and regenerative braking to gain these advantages.

SUMMARY

These and other needs are addressed by the various embodiments and configurations of the present invention which are directed generally to controlling the individual prime power systems of a multi-prime power source vehicular propulsion system. The inventions disclosed herein are applicable to locomotives utilizing prime power sources such as diesel engines, gas turbine engines, fuel cells, other types of internal combustion engines or combinations of these. The inventions may also apply to other types of vehicles or systems that require substantial power and low emissions utilizing multiple power plant combinations In particular, the objective of the present invention is to disclose a method for controlling and balancing multiple prime power sources on a locomotive during propulsion, dynamic braking and idling.

In a first embodiment, the propulsion system includes (1) a plurality of prime power systems, each prime power system including a prime power source and a mechanical-to-electrical energy conversion device to convert energy output by the prime power device into direct current electrical energy; (2) a direct current bus connecting the prime power systems, the direct current bus carrying the direct current electrical energy to and/or from the prime power systems; (3) a voltage sensor for measuring a voltage level across the direct current bus; (4) a plurality of current sensors, each current sensor measuring a direct current electrical energy outputted by a selected prime power system; and (5) a control system operable, based on the measured voltage level across the direct current bus and the respective measured direct current electrical energy into and/or out of each prime power system, to control one or more of a mechanical parameter of the selected prime power system; an electrical parameter of the selected prime power system; and an electrical parameter of the direct current bus.

The prime power systems can have a number of configurations. In one configuration, each system includes an engine, an alternator that converts mechanical energy output by the engine into alternating current electrical energy, and an electrical converter apparatus that converts the outputted alternating current electrical energy into direct current electrical energy. In another configuration, each system includes a fuel cell and a voltage regulator circuit to regulate the output voltage of the fuel cell.

In one multi-engine configuration, the multi-engine locomotive includes as many as ten separate engines, where the engines need not be of the same type or power rating and may even use different fuels. The various engines are connected in parallel to a common DC bus electrical architecture so that engines need not be synchronized.

In a multi-engine configuration, a control algorithm strategy allows for various modes of engine operation, such as for example, a maximum fuel efficiency mode, a minimum emissions mode, a combination mode of good fuel efficiency and low emissions, an optimum engine lifetime mode, and a maximum power mode. These various modes are normally selected using engine fuel and emissions maps. The choice may be determined by the engineer or by a predetermined algorithm based on data from the locomotive's route location and requirements for the zone in which the locomotive or consist member is operating.

In various configurations, a control algorithm strategy allows for selection the number of prime power systems to be used in any of the locomotive operating modes of propulsion, dynamic braking and idling. The control algorithm strategy also allows for selection of specific prime power systems to be used, preferably based on usage logs or less preferably using a random number selection or rotating prime power system sequence selection.

In the above embodiments, the selected engine operating mode can be based on the use of engine fuel maps and emissions maps to set the engine's operating point to produce the required power, specific fuel consumption and emissions rate.

The embodiments can further include automatic balancing of each prime power system's power output in accordance with the system's power capacity. This can be accomplished by measuring the current, in the case of engines, at the output of each alternator's rectifier. The measured current is used in a control feedback loop to modify the system's alternator excitation current to bring the system's power contribution into balance with its pro rata portion of the total power to the DC bus.

In addition, the algorithms presented for controlling power in any of a number of power notch, idle and dynamic braking settings, can include procedures for activating prime power systems that are not on-line and deactivating prime power systems which are not needed. For example, a deactivated engine may be idled but not providing power to the DC bus, or the engine may be shut down.

In a further embodiment, a propulsion system is provided that includes an engine system comprising an engine and an n-phase alternator operable to convert mechanical energy output by the engine into alternating current electrical energy, with each phase corresponding to an armature winding; one or more traction motors in electrical communication with the alternator; a voltage boost circuit electrically connected with each of the n-armature windings of the alternator to boost the output voltage associated with each armature winding. Each armature winding provides an inductance for the voltage boost circuit.

This embodiment can provide an alternator/rectifier with output voltage boost control suitable for maintaining a high level of output voltage to a load such as a DC bus even at low alternator rpms. In one configuration, the voltage boost capability for a 3-phase alternator is provided by a single IGBT, a single capacitor and 3 additional power diodes added to the circuit of a conventional alternator/rectifier to accomplish independent voltage output control for variable alternator rotor speeds. The amount of output voltage boost is controlled by the duty cycle of the IGBT. Each armature coil of the alternator serves as the voltage source and energy storage inductor in a voltage boost circuit.

As shown, the present invention can permit the control of a multi-power source locomotive in a manner that substantially optimizes engine performance in terms of fuel economy, emissions compliance, and power source lifetime, while preserving the option of very high power for acceleration when needed.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

An electrical energy converter refers to an apparatus that transmits or blocks the flow of electrical energy and may also increase or reduce voltage and change the frequency of the transmitted energy including changing the frequency to zero. Examples but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

Dynamic braking is implemented when the electric propulsion motors are switched to generator mode during braking to augment the braking force. The electrical energy generated is typically dissipated in a resistance grid system.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (non-conducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The general control method of the present invention can be applied to a locomotive with multiple prime power sources.

These can be internal combustion engines such as diesel engines for example, or fuel cells, or a combination of engines and fuel cells. The principal problem of control is (1) to accurately determine the power output of each prime power source to a common DC bus, most preferably by measuring the current output of each prime power system at the DC bus and then (2) to use this determination to modify the mechanical and/or electrical parameters of each prime power system to ensure that the power being supplied to the DC bus is provided at the selected operating conditions of each prime power system and in the selected amount from each prime power source. In much of the following detailed descriptions, the method is illustrated by multiple engine systems. As described later in the detailed descriptions, fuel cells may be used in place of or in combination with engines.

Multi-Engine System Control Architecture

Figure 1:
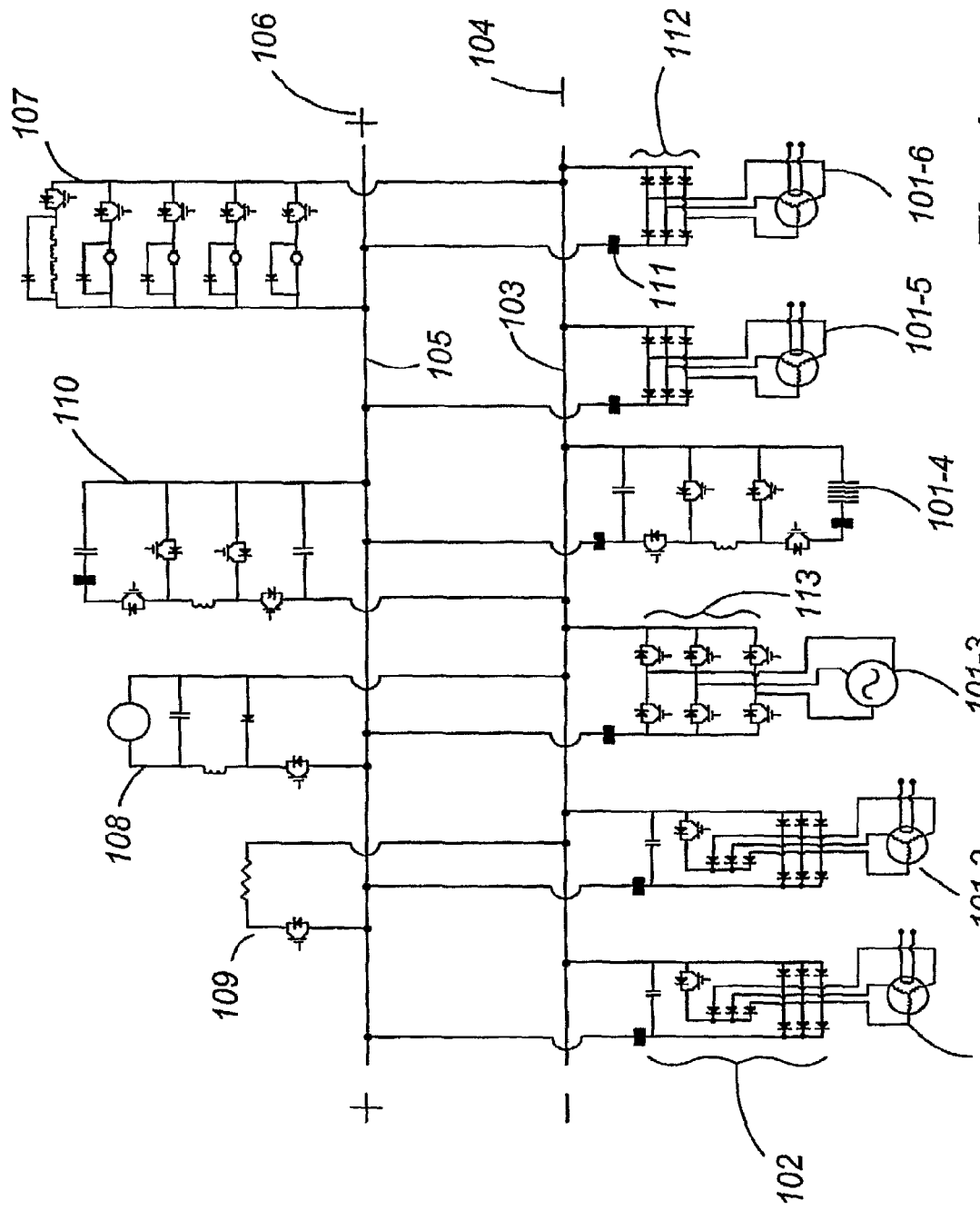
FIG. 1 is an example of the overall electrical schematic of a multi-engine locomotive power system.

FIG. 1 is a schematic circuit of the present invention applied to a locomotive with six prime power sources. Engines 101-1 and 101-2 are shown with voltage boost alternator/rectifiers 102. Engine 101-3 is shown with an induction alternator and converter system 113. The converter allows energy to flow to or from the DC bus to allow for energy to be dissipated in engine 101-3 if needed. Power source 101-4 is a fuel cell system with a buck/boost circuit for regulating the voltage output of the fuel cell. Engines 101-5 and 101-6 are shown with wound rotor alternator/rectifiers 112. These six prime power systems are the principal power sources providing power to a DC bus shown by conductors 103 and 105. Conductor 103 is shown here as the negative side 104 and conductor 105 is shown as the positive side 106. A capacitor bank 110 provides an energy storage capability. In the locomotive, the capacitor bank 110 can be used, for example, to control the range of voltages on the DC bus. The capacitor bank 110 may be maintained in a state-of-charge by DC power from one or more of the engines or from power from a dynamic braking system by, for example, a buck/boost circuit. The circuit of FIG. 1 also includes a propulsion system 107 shown here with 4 traction motors, an auxiliary power system 108 and a resistive grid 109 that provides a dynamic braking capability. This locomotive power circuit is an example of a multi-prime power source locomotive with regenerative braking capability that could be used, for example, as a road switcher. In this example, the DC bus may also allow power from the traction motors to be dissipated during dynamic braking and/or provide power to the capacitor bank 110 which may be used as an energy storage system and/or to start one or more of the engines (if configured such as engine 101-3). The six prime power systems are shown connected in parallel to the DC bus. The output DC current from each prime power system is measured by its own individual current sensor 111. The capacitor bank 110 may be used to provide power for starting one or more engines by any of a number of well-known methods. As can be appreciated, the energy storage system can also be a battery pack or a flywheel storage system. A similar electrical architecture for a multi-engine locomotive was disclosed previously in U.S. patent application Ser. No. 11/200,88 filed Aug. 19, 2005 entitled "Locomotive Power Train Architecture".

Multi-Engine Start-up Method

A conventional battery operated starter motor can be used to start an engine. Alternately, a compressed air driven engine starter system may be utilized, making use of the compressed air supply associated with, for example, an air brake system. The use of an induction alternator, when at least one other electrical power source is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

Prime power source 101-3 of FIG. 1 shows an induction alternator/inverter circuit for forward or reverse power flow. The amount of excitation for an induction alternator is controlled by the frequency of the inverter. When the frequency of the inverter is higher than the alternator synchronous speed frequency, the alternator will produce a positive torque (motoring). When the inverter frequency is lower than the synchronous speed-frequency, the alternator will produce a negative torque (generating). The use of an induction alternator in motoring mode, when at least one electrical power source (for example, a diesel and its alternator, a turbine and its high-speed alternator, or an energy storage apparatus and its buck/boost circuit) is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above diesel engine start-up procedures are well-known, they can be applied more readily utilizing the voltage control and DC bus architecture of the present invention. In braking mode, the inverter circuit can be controlled to allow power to flow back to the alternator in asynchronous mode so that the alternator will turn the crankshaft of the engine and dissipate energy. Thus, during braking, the engines can be used as additional means of energy dissipation for example when the energy storage system can no longer absorb regenerative energy and/or when the dissipating resistive grid becomes overheated. Alternately, the engines can be used to dissipate excess braking energy in place of a dissipating resistive grid. As can be appreciated, the use of the engine or engines to dissipate braking energy can be used for dynamic braking in a conventional locomotive, replacing the dissipating resistive grid apparatus.

Engine System Operating Modes

A road switcher may be required to provide maximum power when hauling a number of freight cars on a mainline between stations at moderate to high locomotive speeds. In this situation, the engines can be run at their optimum design speed to provide power to the DC bus and be operated at or near maximum fuel efficiency. In this case, there would be no need for the output voltage of the alternator/rectifier to be boosted.

On the other hand, the road switcher may be required to provide maximum torque at low locomotive speed when assembling a train in a switch yard. In this situation, the engines can be run at low speed to (1) augment power output from an energy storage unit such as battery pack for propulsive power or (2) charge the energy storage unit. In order for the engines to provide power to the DC bus at a voltage comparable to that of the energy storage unit and be operated at or near maximum fuel efficiency, the output voltage of the alternator/rectifiers would have to be boosted, as is possible with the present invention.

As can be appreciated, there can be other operational modes where one of the engines is run at full power and high rpm while the other engine is run at low speed but not idled.

In this case, the engine run at high speed would not require an output voltage boost while the engine run at low speed would require an output voltage boost in order to have the necessary output voltage required to provide power to a DC bus and still optimize fuel efficiency.

The advantages of the present invention can be further illustrated by reference to maps of engine power, torque and fuel consumption versus engine speed.

Figure 2:
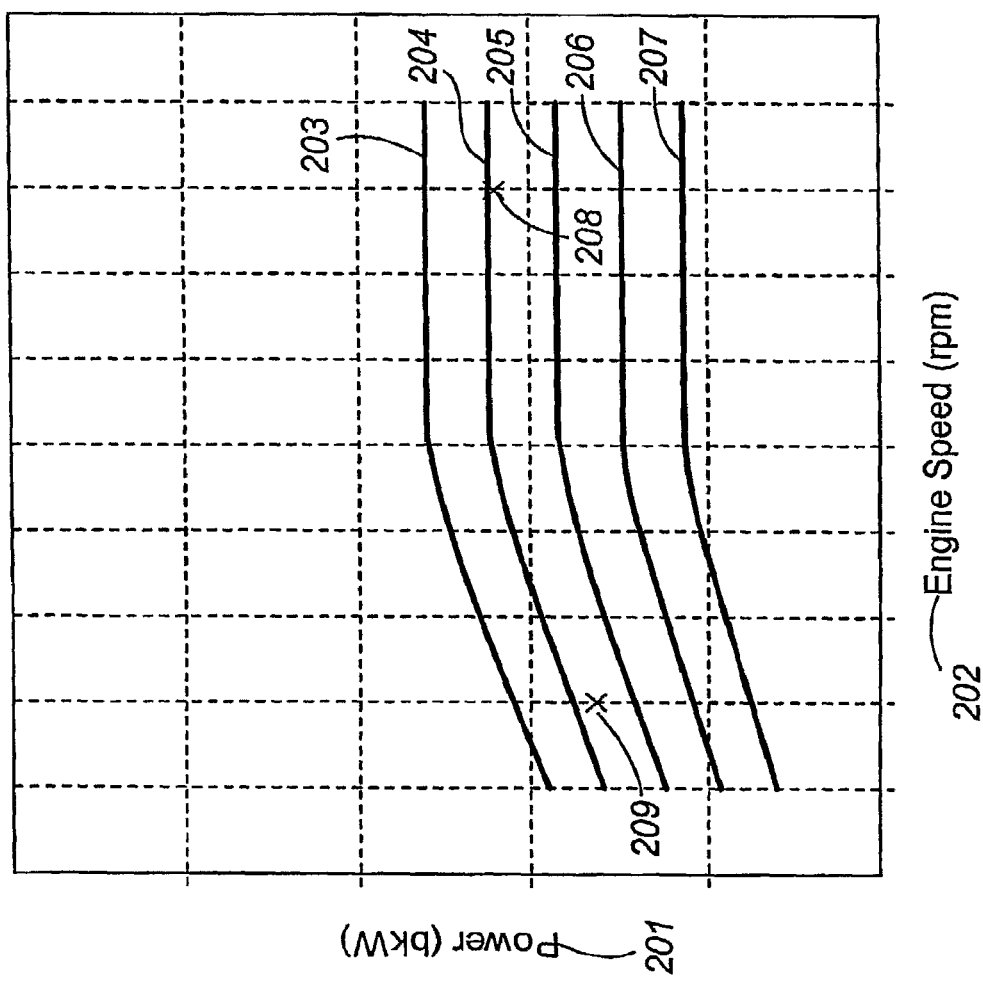
FIG. 2 is an plot of engine power versus engine speed.

A typical engine output power 201 versus engine speed 202 plot is shown in FIG. 2. Curves 203, 204, 205, 206 and 207 represent typical maximum engine power output versus engine speed for recommended uses as often specified by the engine manufacturer. Examples of types of uses are:

service 203 where maximum power is required for periodic overloads;

high intermittent service 204 and low intermittent service 205 where maximum power and/or speed are cyclic;

continuous service 206 where power and speed are cyclic continuous heavy duty service 207 where the engine is operated at maximum power and speed without interruption or load cycling Locomotives typically operate in service where power and speed are continuous but cyclic and where the locomotive periodically requires operation at maximum overload power. A high speed operating point 208 where the output voltage of the alternator/rectifier requires no boost is shown along with a low speed operating point 209 where the output voltage of the alternator/rectifier requires a boost to continue to provide power to a DC bus such as shown in FIG. 1.

Figure 3:
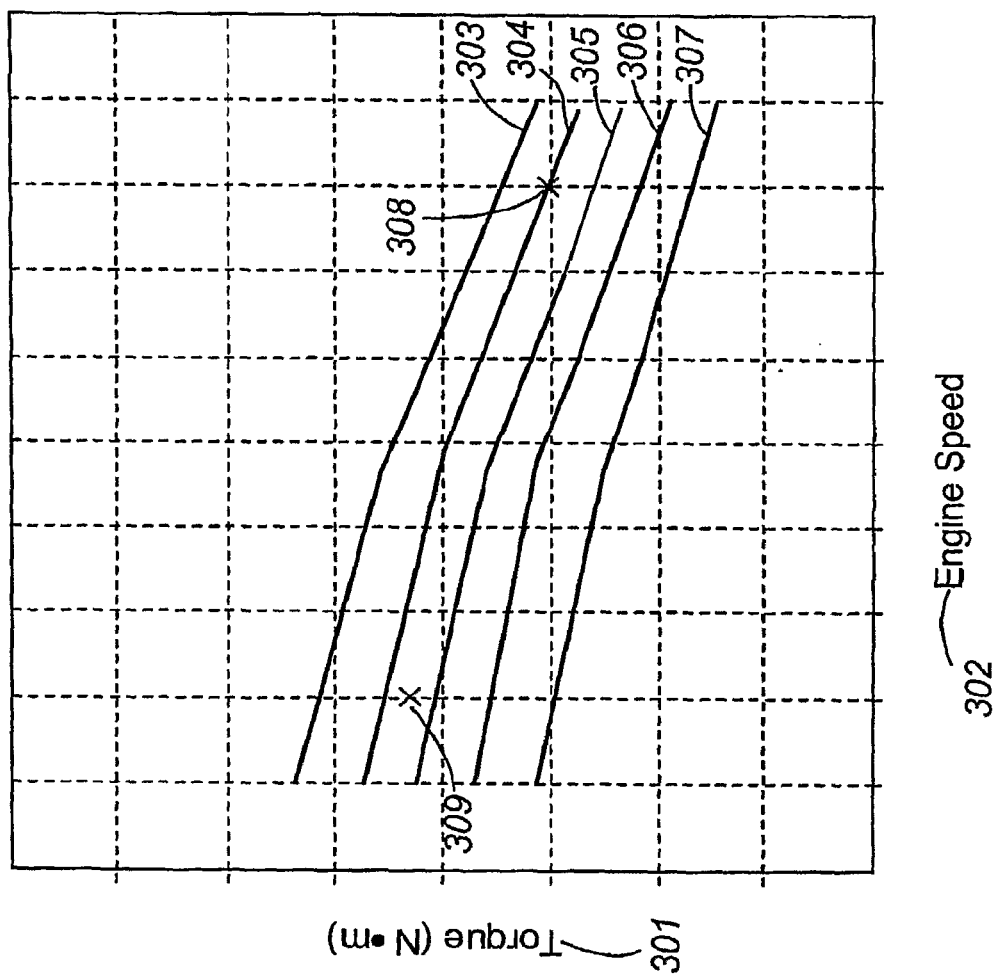
FIG. 3 is an plot of engine torque versus engine speed.

A typical engine output torque 301 versus engine speed 302 plot is shown in FIG. 3. Curves 303, 304, 305, 306 and 307 represent the torque at the corresponding power and speeds shown by curves 203, 204, 205, 206 and 207 of FIG. 2. Torque is proportional to power divided by rotary speed and therefore decreases with increasing engine speed when output power is approximately constant. A high speed operating point 308 is shown along with a low speed operating point 309, corresponding to the operating points 208 and 209 respectively of FIG. 2.

If a locomotive utilizes multiple diesel engines, then the control of these engines, as they are brought on-line to supply power to a DC bus or taken off-line, is the subject of the present invention. The following are examples of how diesel engines may be operated in various modes. As can be appreciated, similar operating modes may be used for other types of engines.

Examples of operating modes include:

maximum fuel efficiency minimum emissions mode (whether of a substance or energy, such as noise)

a combination mode of good fuel efficiency and low emissions maximum power mode an optimum engine lifetime mode As can be appreciated, engines may be selected to operate in different modes at the same time. For example, some engines may be operated in a fuel efficient mode while others are operated in a low emissions mode such that, for example, the locomotive as a whole is operated at a desired overall fuel efficiency and emissions performance level.

Maximum Fuel Efficiency Mode

Figure 4:
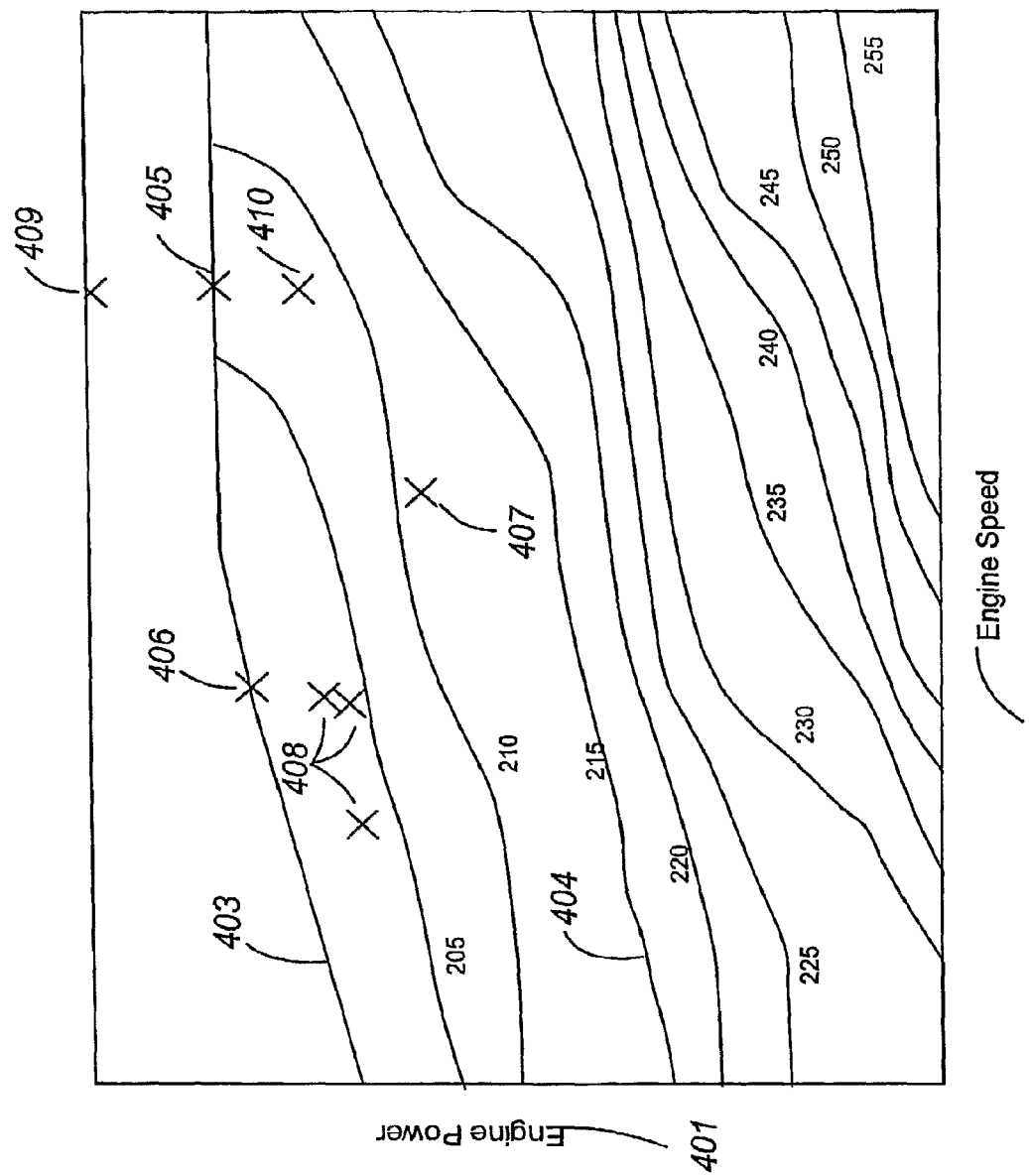
FIG. 4 is an example of a fuel map for a diesel engine.

A typical diesel engine fuel map is shown in FIG. 4. In this example, engine output power 401 is plotted versus engine speed 402. The power is typically in kW and the speed is typically in revolutions per minute ("rpms"). In some fuel maps, engine output torque may be plotted versus engine speed but in the present invention it is preferable to plot power versus speed. The maximum recommended power for a specific type of use (described previously in FIG. 2) available at any engine speed is shown by the power limit curve 403. Contours 404 of constant specific fuel consumption are also shown. The contours 404 are typically expressed as grams of fuel consumed per kW-hr of output energy or liters of fuel consumed per kW-hr of output energy. In the example contours shown in FIG. 4, the specific fuel consumption values of each contour are shown expressed grams of fuel consumed per kW-hr. In FIG. 4, a nominal predetermined operating point 405 is shown. A maximum fuel efficiency operating point 406 is shown where the output power and engine speed are lower than the nominal operating point. A minimum NOx emissions operating point 407 (described further in FIG. 5) is shown where the output power and engine speed are also lower than the nominal operating point and at a significantly lower power than the maximum fuel efficiency operating point 406. Operating points 408 all represent combinations of both lower specific fuel consumption and NOx emissions as compared to the nominal operating point 405. Operating point 409 is an example of increased output power at the same engine speed as the nominal operating point 405. This operating point may be selected for, for example, by the requirement for a short burst of maximum power for rapid acceleration. Typically, the control system on an engine can allow an engine to run at a higher power rating for a limited time, then will automatically derate the engine to a lower power curve after the specified time period has elapsed. Finally, operating point 410 is an example of reduced output power at the same engine speed as the nominal operating point 405 which may be selected for increasing engine lifetime. A combination of slightly increased engine speed and/or reduced operating power (as compared to the nominal operating point 405) may also be used to increase engine lifetime due to reduced internal pressures and stresses in the combustion cycle of the engine. The above illustrates an example of the use of a fuel map for determining a selected engine operating mode.

Minimum Emissions Mode

Figure 5:
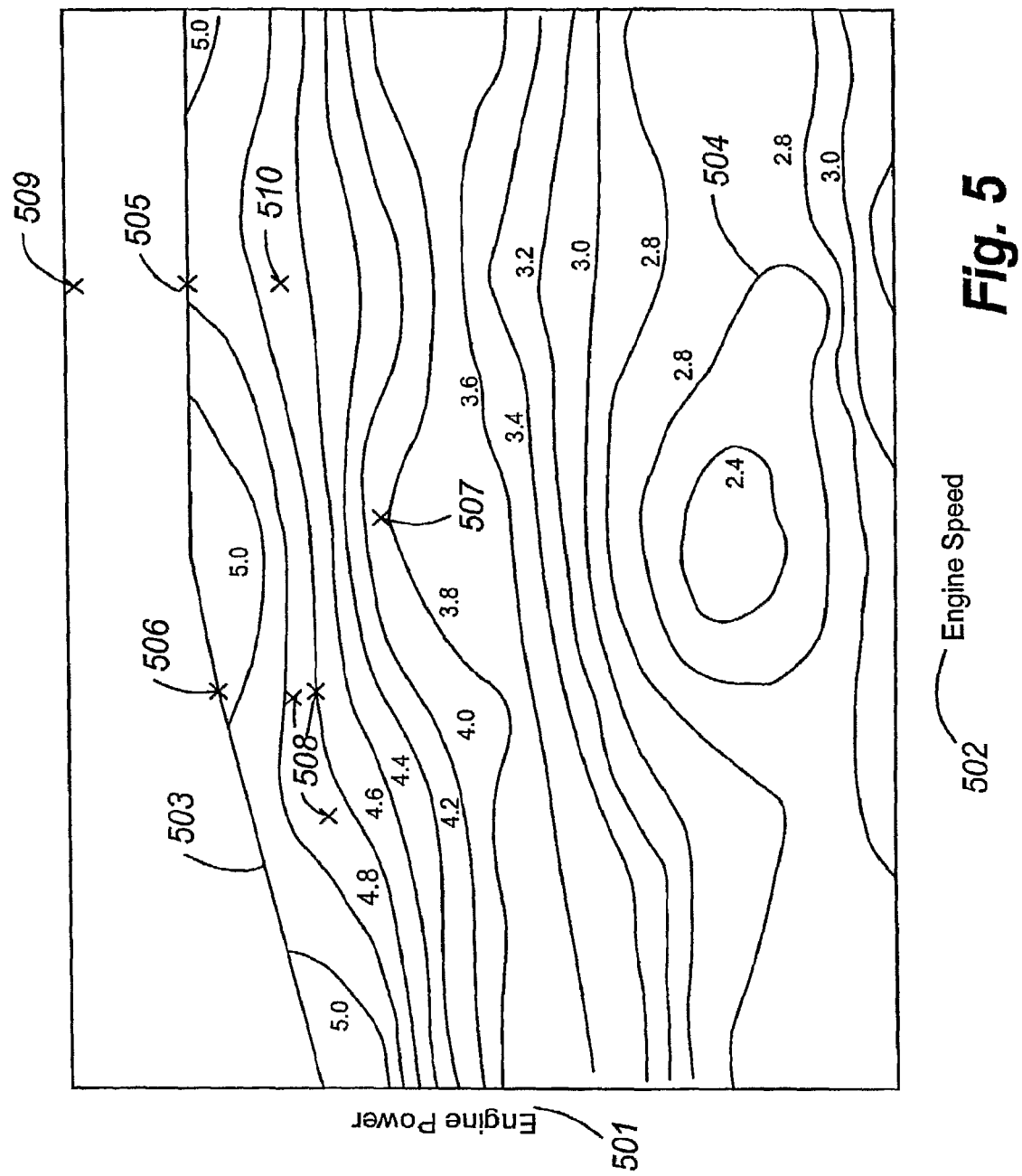
FIG. 5 is an example of an emissions map for a diesel engine.

A typical NOx emissions map is shown in FIG. 5. In this example, which corresponds to the fuel map of FIG. 4, engine output power 501 is plotted versus engine speed 502. The power is typically in kW and the speed is typically in revolutions per minute ("rpms"). In some emissions maps, engine output torque may be plotted versus engine speed but in the present invention it is preferable to plot power versus speed. The maximum recommended power for a specific type of use (described previously in FIG. 2) at any engine speed is shown by the power limit curve 503 and corresponds to limit curve 203 in FIG. 2. Contours 504 of constant specific NOx emissions are also shown. The contours 504 are typically expressed as grams of NOx emitted per kW-hr of output energy. In the example contours shown in FIG. 5, the specific NOx emission values of each contour are shown expressed grams of NOx emitted per kW-hr. In FIG. 5, a nominal predetermined operating point 505 is shown which corresponds to the nominal operating point 405 of FIG. 4. A maximum fuel efficiency operating point 506, a minimum NOx emissions operating point 507, a maximum power operating point 509 and a optimum engine lifetime operating point 510 are also shown and correspond to the maximum fuel efficiency, minimum NOx emissions, maximum power and optimum engine lifetime operating points of FIG. 4. Similarly, operating points 508 represent combinations of both lower specific fuel consumption and NOx emissions compared to the nominal operating point 505.

As can be seen, both fuel and emissions maps are used to select a desired operating mode, since, in general, fuel consumption improves with decreasing engine speed with little change in NOx emissions levels, while NOx emissions can be reduced with a reduction in power but at the expense of increased fuel consumption. As can be appreciated, operating points may also be selected to minimize particulate and other emissions using similar maps relating to these emissions.

Multi-Engine Control Loops

Figure 6:
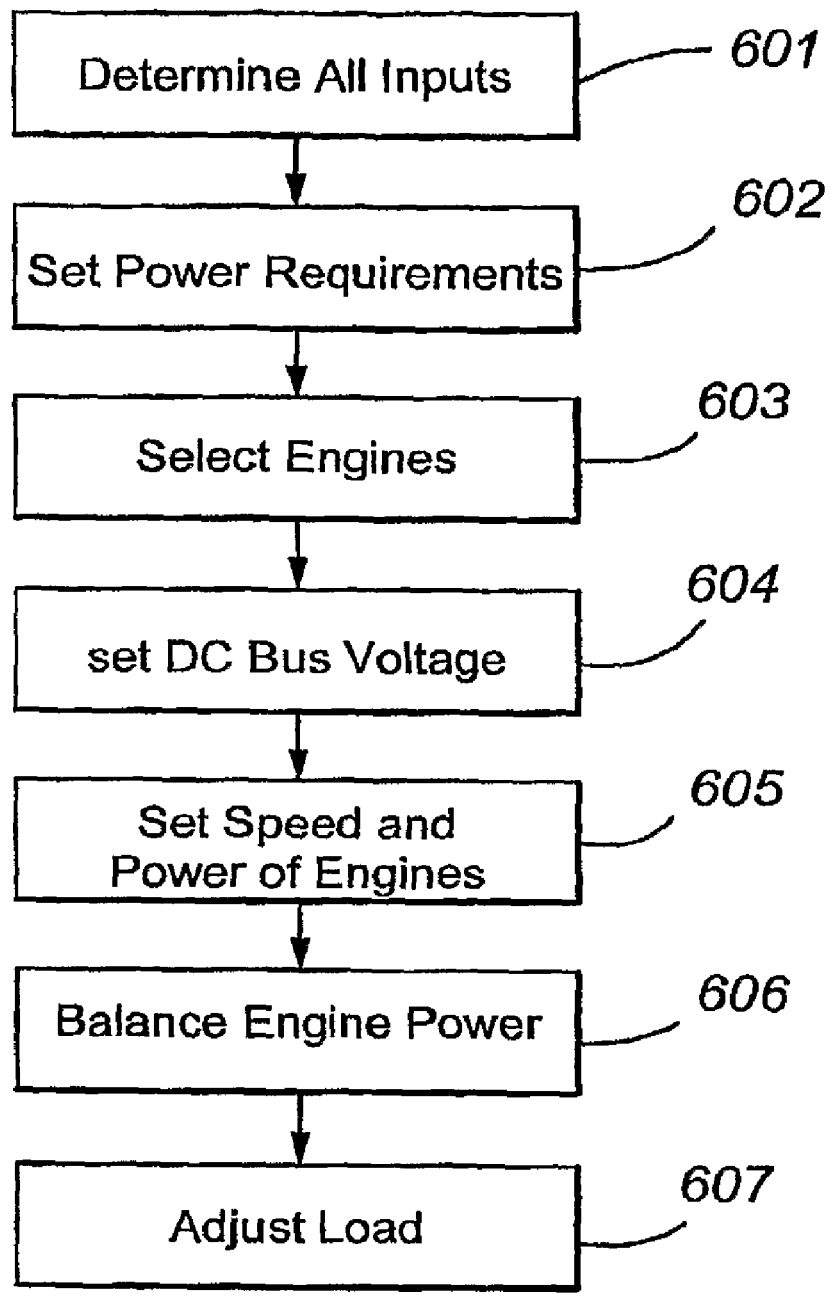
FIG. 6 is an overview flowchart showing the primary steps in a multi-engine control loop.

FIG. 6 is an overview flowchart showing the primary steps in a multi-engine control loop. In FIG. 6, step 601 determines all the inputs required to set locomotive power requirements, select engines, set the DC bus voltage, set the power and speed of the engines, balance the flow of power from the engines and adjust the load if load control is available. Step 602 is where the power requirements for the locomotive are established depending on a number of variables determined in step 601. In step 603, engines are selected. This includes the number of engines, the specific engines, which engines need to be activated for future use and which engines can be deactivated. In step 604, the DC bus voltage is selected. A specific operating voltage is selected for the load control embodiment. The DC bus voltage is set in the embodiment which has no load control. In step 605, the power and speed (rpms) of each engine is set based on the power requirements and engine operating mode determined in step 602. In step 606, the power outputs of all engines are measured by measuring current output from each alternator/rectifier systems. In this step, the power outputs are balanced so that each engine is contributing its pro rata share of the output power. This step is most preferably accomplished by adjusting alternator voltage boost to achieve sufficient output voltage from the alternator/rectifier to provide the required alternator/rectifier output current. This step is may alternately be accomplished by adjusting alternator excitation current to achieve the required alternator/rectifier output current. This step may also be accomplished by adjusting engine speed (rpms) to achieve the required alternator/rectifier output current. Finally, in step 607, the load is adjusted if load control is used. In this step the power to the load is adjusted to equal the power available from the DC bus. This is accomplished for example by choppers which regulate DC traction motors or inverters which regulate AC motors.

Figure 7:
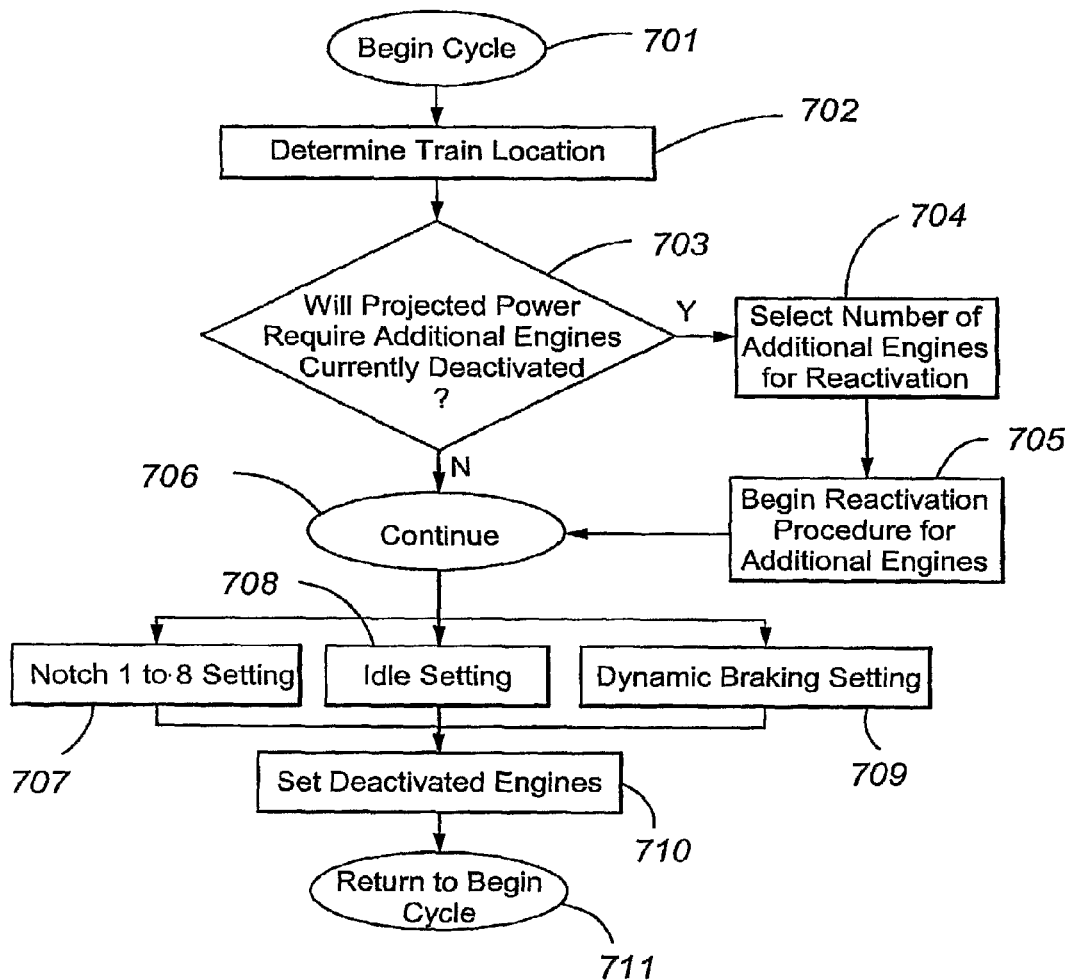
FIG. 7 is an example of a main flow chart of automated decision making for controlling the overall multi-engine selection process.

FIG. 7 is an example of a main flow chart of a simple automated decision making for controlling the overall multi-engine selection, operating and balancing process. This cycle of decisions can be executed continuously (for example every millisecond) or intermittently (for example every 1 second) or at intervals in between by a predetermined computer program or by a computer program that adapts, such as for example, a program based on neural network principles. As can be appreciated, many of the steps can be carried out in different sequences and some of the steps may be optional.

As is common practice, the choices of applying traction power, applying dynamic braking or operating the locomotive at idle to supply auxiliary power are made by the locomotive engineer or operator utilizing controls in the cab, or via a remote-control or equivalent system when, for example, in a switch yard.

As shown in the example of FIG. 7, an automated cycle begins 700. The first step 702 is to estimate the power requirements and operating mode of the locomotive. In step 703, the requirement for additional engines currently deactivated is established from step 702. If additional engines are required, then the number of currently deactivated engines that must be activated is determined in step 704. This engine activation step is described more fully in FIG. 13. The engine activation procedure is implemented in step 705 and the cycle then continues 706. As noted above, the locomotive operating mode is commonly set by the locomotive's engineer. These are (1) a notch 1 to 8 power setting 707, (2) an idle setting 708, or (3) a dynamic braking setting 709. For each of three power modes, it is possible that one or more engines may be deactivated. Deactivation means idling an engine so that it does not provide power to the DC bus, or shutting off the engine. The deactivation of engines is controlled in step 710. Step 711 returns to the beginning of the main control cycle.

Figure 8:
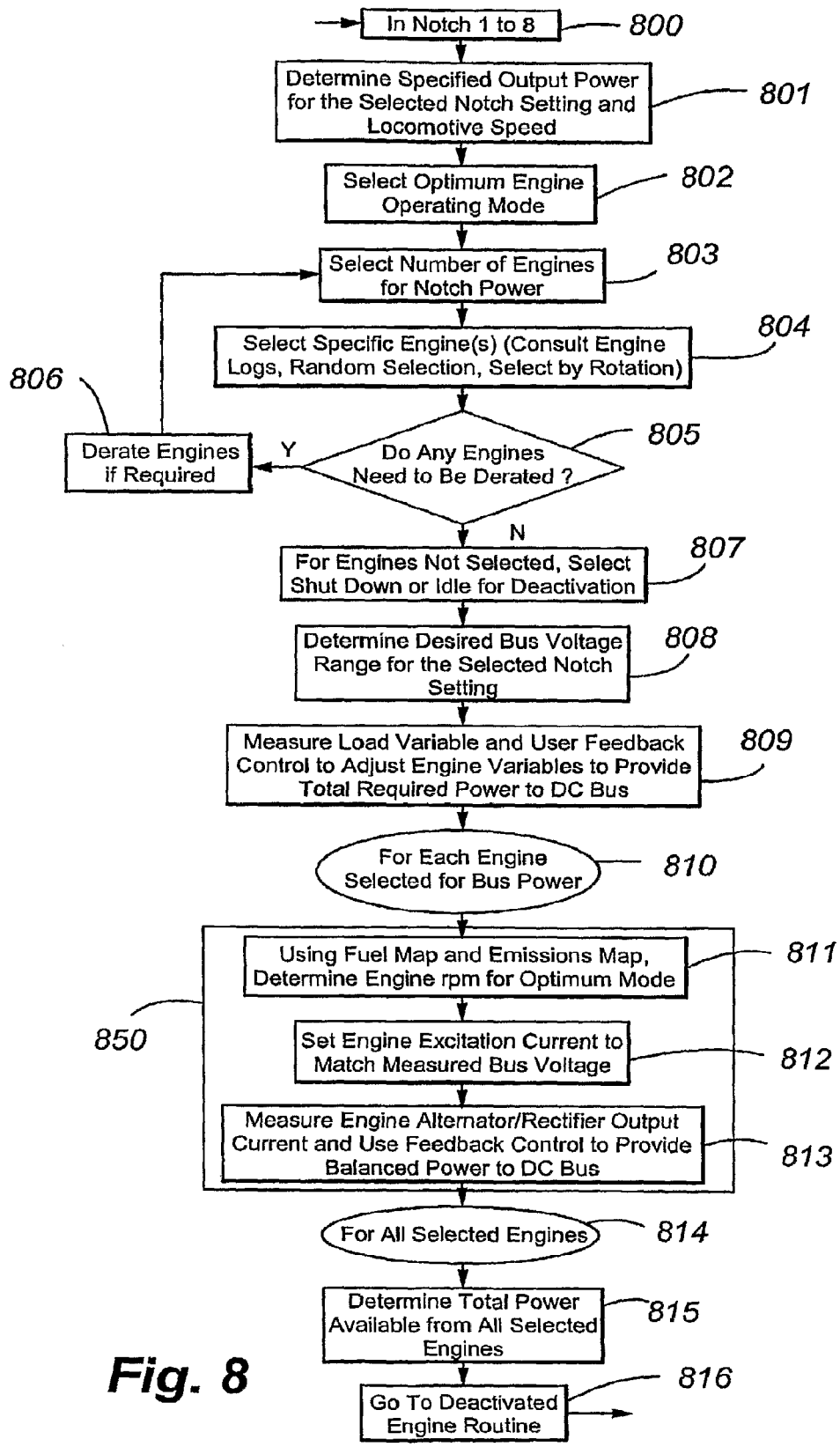
FIG. 8 is an example of a flow chart for selecting and configuring engines for any of the notch 1 to 8 power settings with no load control.

FIG. 8 shows an example of a flow chart for automated selection and configuration of engines for any of the notch 1 to 8 power settings 800. This figure illustrates the process for a locomotive that does not have an independent means of load control. That is, the traction motors may be able to consume more power than the engines can provide, depending on engine alternator excitation settings and traction motor volts which are a function of locomotive speed. The first step 801 is to determine the power associated with the notch number selected by the engineer and to determine the locomotive speed. The latter can be determined from a number of well-known means such as for example by a speedometer, by measuring axle rpms, by using a radar system and the like. Each notch number is typically associated with a predetermined power level at each locomotive speed, notch 1 being the lowest power setting and notch 8 being the highest power setting. As can be appreciated, the power level associated with each notch setting can be varied from time to time by reprogramming an on-board computer. The next step 802 is to determine the desired engine operating mode. Examples of operating modes, which were previously illustrated in FIGS. 4 and 5, include a maximum fuel efficiency mode, a minimum emissions mode, a combination mode of good fuel efficiency and low emissions, an optimum engine lifetime mode, and a maximum power mode. The choice may be determined by the engineer or by a predetermined algorithm based on data from the locomotive's route location and requirements for the zone in which the locomotive or consist member is operating.

The next step 803 is to determine the number of engines operative to provide power to the DC bus. Step 803 may be carried out by an algorithm controlled by an on-board computer. It may also be based on a predetermined lookup table which associates each notch, each appropriate locomotive speed range and its various operating modes with an operating point such as described in FIGS. 4 and 5. It is also possible that, at some notch settings, all but one of the engines can be set at or near the selected operating points and the all but one engine can be used to balance out the total selected notch power by being set at a non-optimum operating point. Alternately, the all but one engine can be used to balance out the total selected notch power by using its alternator voltage boost to independently control its output voltage and thus can also be set at a its optimum operating point. This provides a degree of control over power output and operating points that is not available with a single large engine. A single large engine can be set at only one power and speed setting and often has to trade off better fuel economy for low emissions. In a multiple engine locomotive of the present invention, all but one of the power-producing engines (or all when alternator boost is available) can be tuned to optimize power, fuel consumption and emissions and often the one engine can be operated near its optimum operating point. In the step 803 where all the engines are the same, selection of the number of engines operative to provide power to the DC bus is typically done by dividing the power requirement determined in step 801 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 804, so as to avoid using some engines more than others and thereby approximately balancing the usage and maintenance period of the engines. An engine log typically contains information on engine usage (hours, fuel consumption, lubricant consumption, total rpms, megawatt-hours, hours in idle modes, hours in the various notch settings and housing in dynamic braking and the like) and maintenance history. Although less preferable than consulting an engine log, the selection algorithm may be engine selection by a random number between one and the number of available engines, which, over time, should tend to even out engine usage. The selection algorithm may be engine selection by rotation to the next engine in an engine sequence which, over time, should also tend to even out engine usage. In the next step 805, a selected engine may need to be derated. For example, the selected engine may have one or more cylinders operating at less than optimum rating, the engine's control system may automatically derate the engine to a lower power after a specified time period of operating at a higher-than-normal power rating or any number of other well-known reasons for derating engine performance. If an engine is required to be derated 806, then the procedure returns to step 803 to re-select the number of engines since the derated engine may require an additional engine to provide the requested power. In the next step 807, the engines not selected for providing power to the DC bus are identified for deactivation and may be selected to be idled or shut down to be deactivated. This deactivation procedure is controlled in step 713 of the main flow chart (FIG. 7) and fully described in FIG. 12.

In the next step 808, the DC bus voltage is measured. As the power consumed by the load (traction motors) increases beyond the optimum engine power capacity, the engine speeds will begin to decrease. In step 809, typically a load variable such as total load current or torque is measured and used in a first control feedback loop to increase engine speeds by decreasing their alternator excitation currents which tends to decrease alternator output voltages. As this occurs for all the engines, the DC bus voltage drops, reducing the power to the load by reducing motor voltage until the total engine power output matches the power required by the load. This is a stable feedback process commonly carried out automatically for each engine by one of a number of well-known proportional integral differential ("PID") control algorithms. Thus, the DC bus voltage may be highly variable, typically ranging from near zero volts to well over 1,000 volts.

The next step 810 begins an internal control loop 850 for each engine to obtain a balanced power flow from each engine. Each engine has a fuel map which is typically a plot of engine power or torque versus engine rpms for various contours of constant specific fuel consumption, and an emissions map which is typically a plot of engine power or torque versus engine rpms for various contours of constant specific $NO_x$ emissions. As can be appreciated, there may be additional emissions maps for hydrocarbons and particulate matter and the like. In step 811, the rpms of the selected engine is determined so as to produce the required power at the specific fuel consumption and emissions rate corresponding to the operating mode selected in step 802. In step 812, the excitation current for the alternator of each engine is selected to provide an alternator output voltage to fall within the range of the DC bus voltage measured in step 808. When available, the amount of alternator boost may also be used to generate output voltage to fall within the range of the DC bus voltage measured in step 808. This latter capability may be useful for example when an engine is derated or when an engine is operated at a lower power and rpm so that the engine may continue to supply power to the DC bus by having independent control over its alternator output voltage.

Step 813 is a step where the current is measured at the output of each alternator's rectifier. This current, which is at the DC bus voltage, is a direct measure of the power flowing from the selected engine. An output current measurement is a sensitive and direct measure of power output of the alternator/rectifier apparatus to the DC bus. The measured current is used in a second control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines to within a predetermined tolerance, preferably in the range of about ±5%. This second control feedback loop is designed to be a stable feedback process commonly carried out automatically for each engine by one of a number of well-known proportional integral differential ("PID") control algorithms.

The next step 814 is executed for all engines after all engines have been balanced via internal control loop 850. In step 815, the total power from all engines to the DC bus is determined, preferably by measuring the currents at the output of each alternator's rectifier and multiplying the sum by the measured DC bus voltage. Once the allocation of power to the traction motors is determined 815, the algorithm proceeds to the engine deactivation control loop 816.

Figure 9:
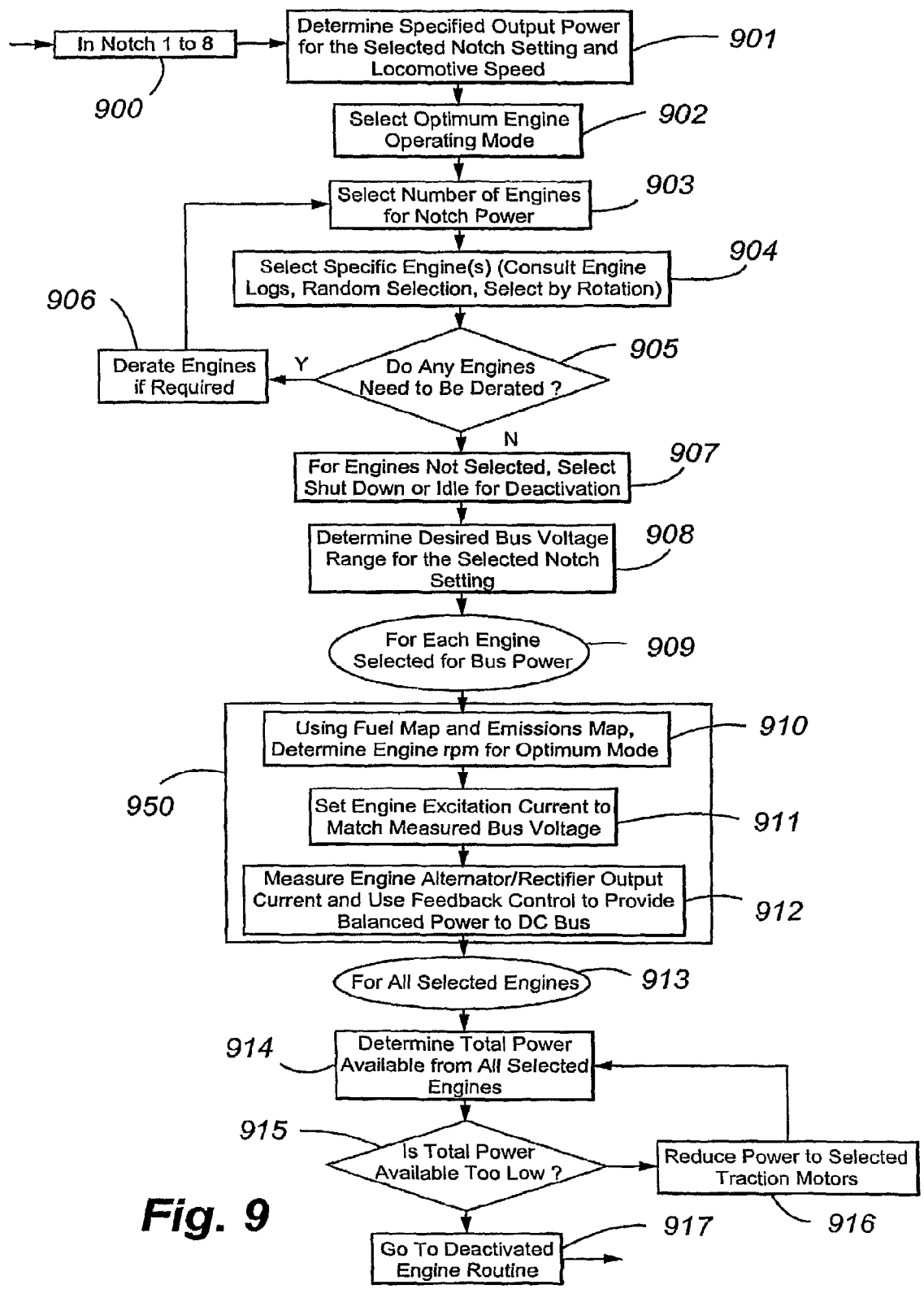
FIG. 9 is an example of a flow chart for selecting and configuring engines for any of the notch 1 to 8 power settings with load control.

FIG. 9 shows an example of a flow chart for automated selection and configuration of engines for any of the notch 1 to 8 power settings 900. This figure illustrates the process for a locomotive that has an independent means of load control which is a preferred embodiment. That is, the power distributed to the traction motors is controlled independently such that the total power distributed to the load is controlled independently to match the power available from the engines. This may be done for example by using one or more choppers at the output of the DC bus to DC traction motors, or by using one or more inverters at the output of the DC bus to AC traction motors. The first step 901 is to determine the power associated with the notch number selected by the engineer and to determine the locomotive speed. As can be appreciated, the power level associated with each notch setting can be varied from time to time by reprogramming an on-board computer. The next step 902 is to determine the desired engine operating mode. Examples of operating modes are described in the discussion of FIG. 8. The choice may be determined by the engineer or by a predetermined algorithm based on data from the locomotive's route location and requirements for the zone in which the locomotive or consist member is operating.

The next step 903 is to determine the number of engines operative to provide power to the DC bus. Step 903 may be carried out by an algorithm controlled by an on-board computer. It may also be based on a predetermined lookup table which associates each notch, each appropriate locomotive speed range and its various operating modes with an operating point such as described in FIGS. 4 and 5. It is also possible as described previously that, at some notch settings, all but one of the engines can be set at or near the selected operating points and one engine can be used to balance out the total selected notch power by being set at a non-optimum operating point. In the step 903 where all the engines are the same, selection of the number of engines operative to provide power to the DC bus is typically done by dividing the power requirement determined in step 901 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 904, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 905, a selected engine may need to be derated. If an engine is required to be derated 906, then the procedure returns to step 903 to re-select the number of engines since the derated engine may require an additional engine to provide the required notch power. In the next step 907, the engines not selected for providing power to the DC bus are identified for deactivation and may be selected to be idled or shut down to be deactivated. This deactivation procedure is controlled in step 119 of the main flow chart (FIG. 7) and fully described in FIG. 12.

In the preferred load control embodiment: the next step 908 is to set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined nominal value for each notch setting, or at a predetermined nominal value for a range of notch settings, or at the same predetermined nominal value for all notch settings.

The next step 909 begins an internal control loop 950 for each engine to obtain a balanced power flow from each engine. Each engine has a fuel map and an emissions map or maps. In step 910, the rpms of the selected engine is determined so as to produce the required power at the specific fuel consumption and emissions rate corresponding to the operating mode selected in step 902. In step 911, the excitation current for the alternator of each engine is selected to provide an alternator output voltage to match the selected DC bus voltage. Step 912 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 913 is executed for all engines after all engines have been set via internal control loop 950. In step 914, the total power from all engines to the DC bus is determined, preferably by measuring the currents at the output of each alternator's rectifier and multiplying the sum by the measured DC bus voltage. If the total power is too low 915 to provide the required power to the traction motors, then the power to selected traction motors is reduced 916 to the amount of power available from the DC bus. This power reduction can be made equal to all traction motors or can be allocated based on an algorithm that considers each powered wheel-set separately. The latter is an available strategy if each traction motor has its own power control apparatus (such as a chopper circuit for each DC traction motor or an inverter for each AC traction motor). Power may be selectively reduced for example on the leading wheel set in wet conditions. Once the allocation of power to the traction motors is determined 914, the algorithm proceeds to the engine deactivation control loop 917.

In a locomotive without an independent means of load control, if the engine power is too low to provide the required power to the traction motors, then (1) the engine power may be adjusted upwards or (2) the power to traction motors may be reduced by lowering the alternator excitation current until the alternator output voltage matches the traction motor voltage. In the preferred multi-engine locomotive control means of the present invention, if the total power from the engines is too low to provide the required power to the traction motors, then preferably the power to traction motors is reduced by a small amount to equal the power available. Alternately, another engine may be added to provide the necessary power in all but the highest notch setting. At the highest notch setting, it is still possible to increase the power output of one or more engines for periodic overloads. Thus, the control and balancing of output power from the engines can always be separately adjusted from the load power requirements of the traction motors by controlling a predetermined maximum load on the engines.

Figure 10:
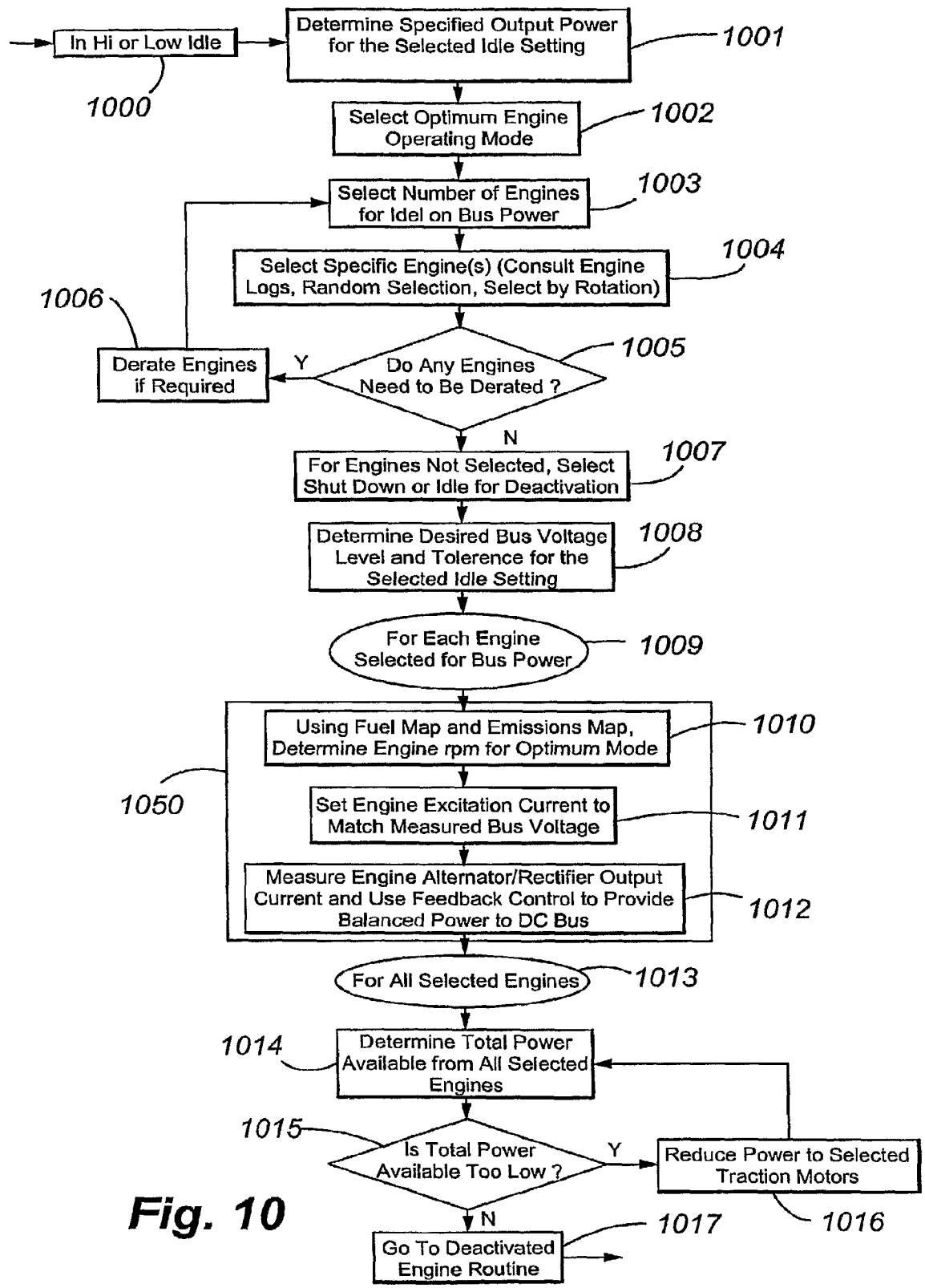
FIG. 10 is an example of a flow chart for selecting and configuring engines for any of number of idle settings.

FIG. 10 shows an example of a flow chart for automated selection and configuration of engines for any of number of idle settings 1000. Typically, a locomotive has a high idle and a low idle setting. The latter may be used, for example, to minimize fuel consumption for long periods of idle. This figure illustrates the process for a locomotive that has an independent means of load control similar to that described in FIG. 9, which is a preferred embodiment. As can be appreciated, the process can be modified for a locomotive that does not have an independent means of load control such as described in FIG. 8. The next step 1002 is to determine the desired engine operating mode. Examples of operating modes are described in the discussion of FIG. 8. The choice may be determined by the engineer or by a predetermined algorithm based on data from the locomotive's route location and requirements for the zone in which the locomotive or consist member is operating. The next step 1003 is to determine the number of engines operative to idle and provide power to the DC bus. Step 1003 may be carried out by an algorithm controlled by an on-board computer. It may also be based on a predetermined lookup table which associates each idle setting and its various operating modes with an operating point such as described in FIGS. 4 and 5. It is also possible that, at some idle settings, all but one of the engines can be set at or near the selected operating points and the all but one engine can be used to balance out the total selected idle power by being set at a non-optimum operating point. Alternately, the all but one engine can be used to balance out the total selected notch power by using its alternator voltage boost, if available, to independently control its output voltage and thus can also be set at a its optimum operating point. This provides a degree of control over power output and operating points that is not available with a single large engine. In the step 1003 where all the engines are the same, selection of the number of engines operative to provide power to the DC bus is typically done by dividing the power requirement determined in step 1001 by the power rating of the engines and rounding the resulting number upwards. In the case where there are engines of differing power ratings, the selection algorithm may be more involved so as to balance the power contribution from each engine. In either case, the algorithm that selects the number of engines may consider the operating history of the engines, as indicated by step 1004, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. In the next step 1005, a selected engine may need to be derated. If an engine is required to be derated 1006, then the procedure returns to step 1003 to re-select the number of engines since the derated engine may require an additional engine to provide the required idle power. In the next step 1007, the engines not selected for providing power to the DC bus are identified for deactivation and may be selected to be idled but not providing power to the DC bus, or shut down to be deactivated. This deactivation procedure is controlled in step 713 of the main flow chart (FIG. 7) and fully described in FIG. 12.

In the preferred load control embodiment, the next step 1008 is to set the desired nominal value and range for the DC bus voltage. The range is preferably ±75 volts from the nominal DC bus voltage, more preferably ±50 volts from the nominal DC bus voltage, and most preferably A ±25 volts from the nominal DC bus voltage. This voltage may be set at a different predetermined value for each idle setting but most preferably at the same predetermined value for all idle settings.

The next step 1009 begins an internal control loop 1050 for each engine to obtain a balanced power flow from each engine. Each engine has a fuel map and an emissions map or maps. In step 1010, the rpms of the selected engine is determined so as to produce the required power at the specific fuel consumption and emissions rate corresponding to the operating mode selected in step 1002. In step 1011, the excitation current for the alternator of each engine is selected to provide an alternator output voltage to match the selected DC bus voltage. When available, the amount of alternator boost may also be used to generate output voltage to fall within the range of the DC bus voltage measured in step 1008. Step 1012 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1013 is executed for all engines after all engines have been set via internal control loop 1050. In step 1014, the total power from all engines to the DC bus is determined, preferably by measuring the currents at the output of each alternator's rectifier and multiplying the sum by the measured DC bus voltage. If the total power is too low 1015 to provide the required power to provide for the idling locomotive, then the idle setting may be changed 1016 to a higher setting, the power provided at the selected idle setting may be increased or the power required by the locomotive may be reduced. A reduction in the hotel power required for a passenger train idling in a station is an example of the latter. Once the allocation of power to the auxiliary power needs is set to match the available power from all the idled but power-contributing engines, the algorithm proceeds to the engine deactivation control loop 1017.

Figure 11:
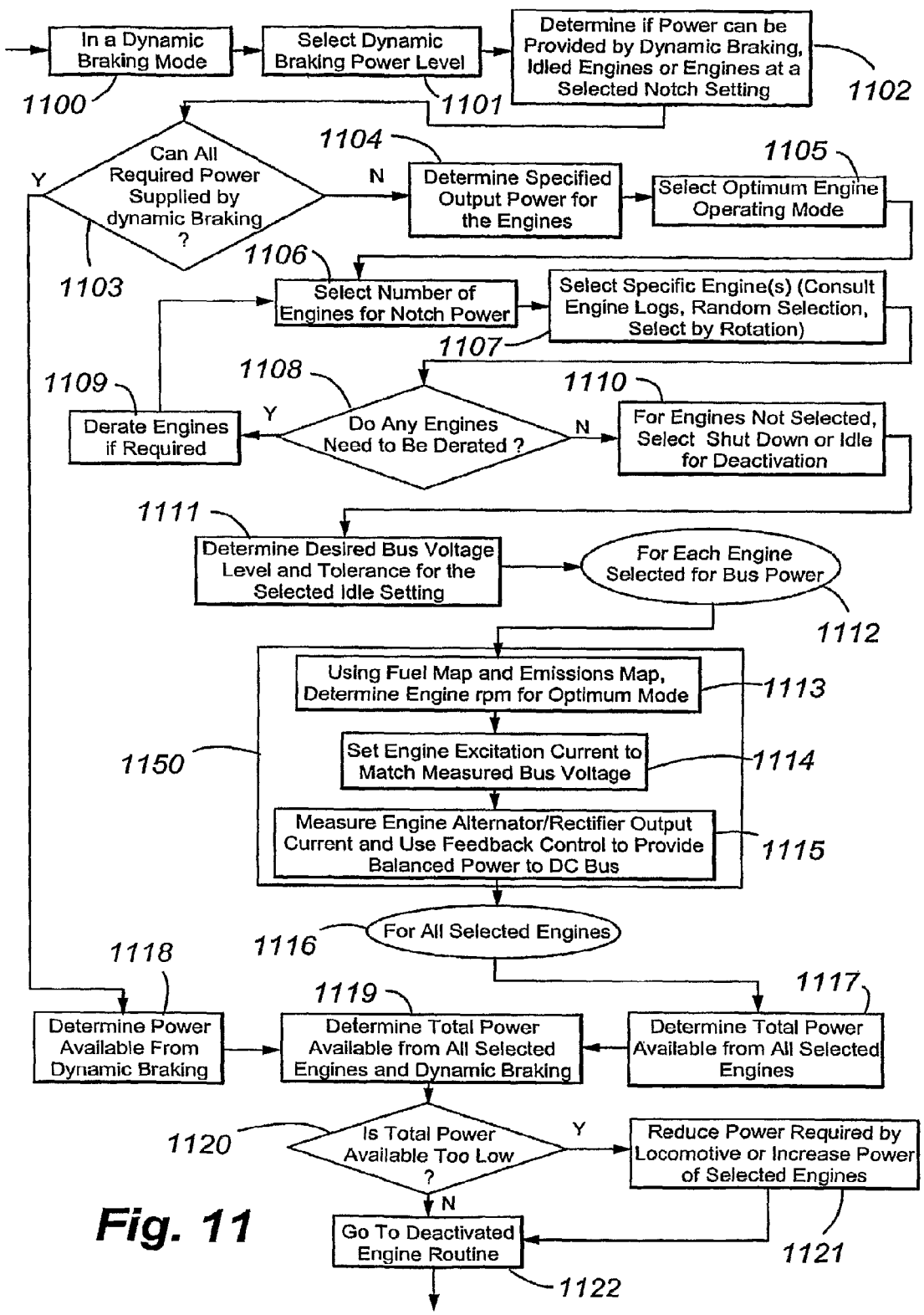
FIG. 11 is an example of a flow chart for selecting and configuring engines for dynamic braking.

FIG. 11 shows an example of a flow chart for automated selection and configuration of engines for dynamic braking 1100. This figure illustrates the process for a locomotive that has an independent means of load control similar to that described in FIG. 9, which is a preferred embodiment. It is understood that the traction motors act as generators during dynamic braking and can provide power back to flow to the DC bus. As can be appreciated, the power level provided by dynamic braking can be controlled by power control circuits associated with the traction motors. The first step 1101 is to estimate the power required by the locomotive during the projected period that the locomotive is expected to be in dynamic braking mode. This can be accomplished using the information available on the locomotive's location along its route and its projected route. The next step 1102 is to determine whether the projected power required can be met by dynamic braking or whether some engine power will also be required. If all the required power can be supplied by dynamic braking 1103, then no engines need be engaged to provide power to the DC bus. This situation can arise, for example, if the train is traveling down a lengthy grade. In this case, the power from dynamic braking may exceed the auxiliary requirements of the locomotive and some of the dynamic braking energy may be switched to a resistive grid for dissipation. As can be appreciated, substantial auxiliary power may be required to operate the traction motor blowers that provide cooling during high current operation typical of dynamic braking and this may require some engine power to the DC bus. In the case where dynamic braking is intermittent or only operative for a short period, engines may be required to provide additional power to the DC bus. If engines are required, they may be operated in an idle setting or a notch power setting, depending on the locomotive's requirements. For example, a road switcher may not require substantial auxiliary power during braking but a commuter train with a large hotel load, may require more power than is available through dynamic braking alone. If engines are required, the next step 1104 is to set the output power required by the engines.

The next step 1105 is to determine the desired operating mode of the engines. Examples of operating modes include a maximum fuel efficiency mode, a minimum emissions mode, a combination mode of good fuel efficiency and low emissions and an optimum engine lifetime mode. The choice may be determined by the engineer or by a predetermined algorithm based on data from the locomotive's route location and requirements for the zone in which the locomotive or consist member is operating. The next step 1106 is to determine the number of engines operative to provide power to the DC bus. This step, which is essentially the same as that described in step 804 of FIGS. 8 and 904 in FIG. 9 is typically done by dividing the power requirement determined in step 1104 by the power rating of the engines and rounding the resulting number upwards in the case where all the engines are the same. In the case where there are engines of differing power ratings, the selection algorithm may be more involved so as to balance the power contribution from each engine. In either case, the algorithm that selects the number of engines may consider the operating history of the engines, as indicated by step 1107, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time should also tend to even out engine usage. In the next step 1108, a selected engine may need to be derated. If an engine is required to be derated 1109, then the procedure returns to step 1106 to re-select the number of engines since the derated engine may require an additional engine to provide the required idle power. In the next step 1110, the engines not selected for providing power to the DC bus are identified for deactivation and may be selected to be idled but not providing power to the DC bus, or shut down to be deactivated. This deactivation procedure is controlled in step 1113 of the main flow chart (FIG. 7) and fully described in FIG. 12.

In the preferred load control embodiment, the next step 1111 is to set the desired nominal value and range for the DC bus voltage. The range is preferably ±75 volts from the nominal DC bus voltage, more preferably ±50 volts from the nominal DC bus voltage, and most preferably ±25 volts from the nominal DC bus voltage. This voltage may be set at a different predetermined value depending on the amount of power estimated from dynamic braking and from the power that can be supplied by the engines. It also depends whether the engines will provide power from an idle setting (such as for example high idle) or from a notch power setting.

The next step 1112 begins an internal control loop 1150 for each engine to obtain a balanced power flow from each engine. Each engine has a fuel map and an emissions map or maps. In step 1113, the rpms of the selected engine is determined so as to produce the required power at the specific fuel consumption and emissions rate corresponding to the operating mode selected in step 1105. In step 1114, the excitation current for the alternator of each engine is selected to provide an alternator output voltage to match the selected DC bus voltage. Step 1115 is a step where the current is measured at the output of each alternator's rectifier. This current which is at the DC bus voltage is a direct measure of the power flowing from the selected engine. An output current measurement is a sensitive and direct measure of power output of the alternator/rectifier apparatus to the DC bus. The measured current is used in a control feedback loop to modify the engine's alternator excitation current to bring the engine's power contribution into balance with its pro rata portion of the total power to the DC bus. In the case where all engines are set to the same output power, each engine is balanced to deliver the same amount of power as the other engines within a predetermined tolerance, preferably about ±5%. This control feedback loop is designed to be a stable feedback process commonly carried out automatically for each engine by one of a number of well-known proportional integral differential ("PID") control algorithms.

The next step 1116 is executed for all engines after all engines have been set via internal control loop 1150. In step 1117, the total power from all selected engines is determined, preferably by measuring the currents at the output of each alternator's rectifier and multiplying the sum by the measured DC bus voltage. The power available from dynamic braking is determined in step 1118. The total power available to the locomotive or consist member is determined in step 1119 which is the sum of the power to the DC bus from the engines and dynamic braking. If the total power is too low 1120 to provide the required power for the braking locomotive, then the power provided by the selected engines may be increased 1121 or the power required by the locomotive may be reduced 1121. Once the allocation of power to the auxiliary power needs is set to match the available power from the selected engines and dynamic braking, the algorithm proceeds to the engine deactivation control loop 1122.

Figure 12:
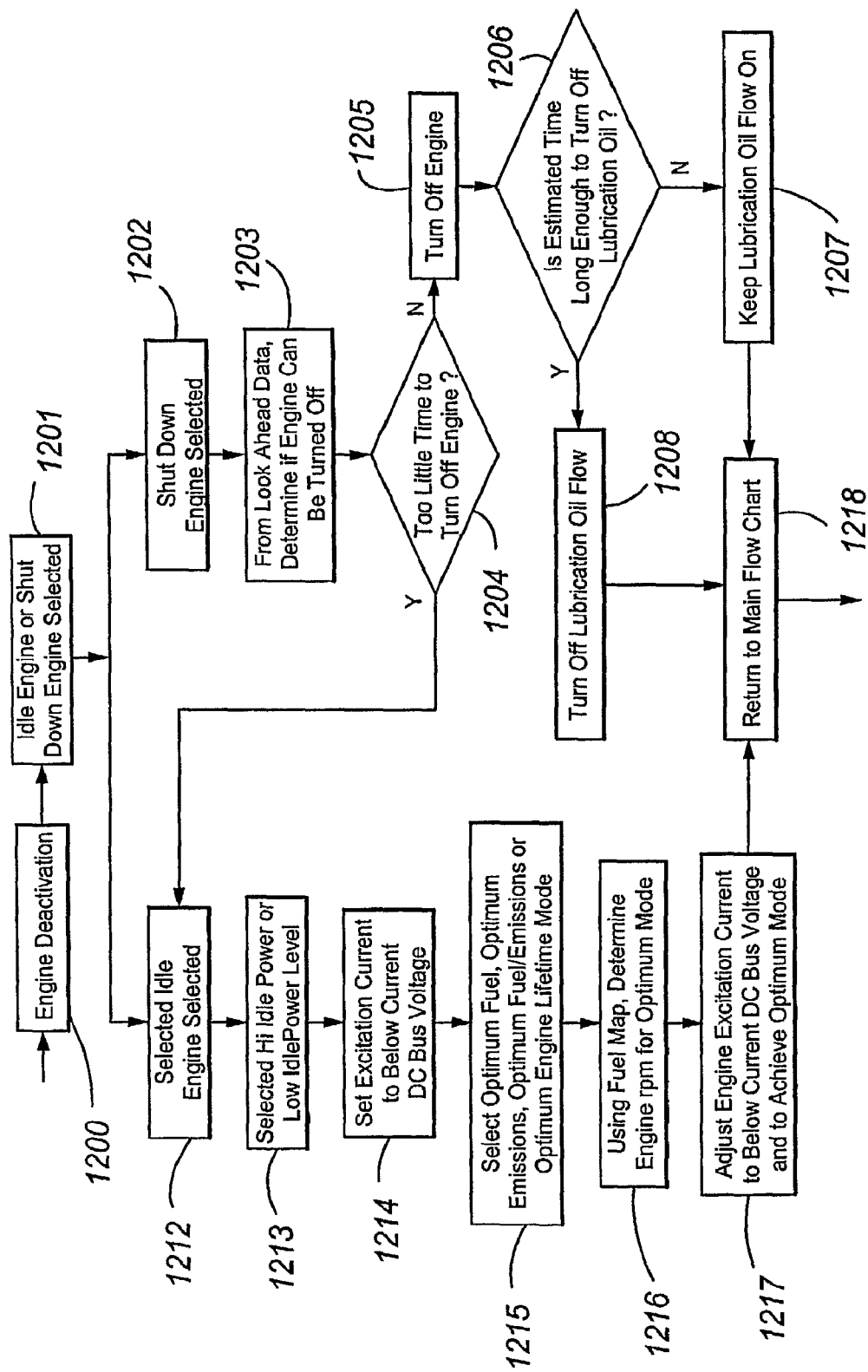
FIG. 12 is an example of a flow chart for controlling engine deactivation.

FIG. 12 is an example of a flow chart for controlling engine deactivation 1200. Deactivation means idling an engine so that it does not provide power to the DC bus; or shutting off the engine. In step 1201, an engine is selected to be idled or shut down for deactivation. If shut down is selected 1202, then the look-ahead route information is queried 1203 to determine if the engine may be needed within a first predetermined time 1204 in which case the shut down selection would not be efficient. If there is too little time before the engine is required again, then the idle mode for deactivation is automatically selected 1212. If there is sufficient time to shut down the engine, then the engine is selected to be turned off 1205. Again, the look-ahead route information is queried 1206 to determine if the engine may be needed within a second predetermined time 1206. Typically, the second predetermined time is longer than the first predetermined time. For example, the second predetermined time may be associated with long periods of low speed operation or idling. If there is too little time before the engine is required again, then the engine lubricating oil circulation is maintained operative 1207. If there is sufficient time to turn off the lubricating oil circulation system, it is turned off 1208.

If idling is selected 1212 for engine deactivation, the next step 1213 is to determine the power associated with the idle setting selected by the engineer. The next step 1214 is to set engine alternator excitation current so that the alternator output voltage is sufficiently below the currently selected DC bus voltage. The next step 1215 is to determine the desired operating mode. Examples of operating modes include a maximum fuel efficiency mode, a minimum emissions mode, a combination mode of good fuel efficiency and low emissions and an optimum engine lifetime mode. The next step 1216 is to use the engine's fuel map to determine the engine idle rpms to achieve the operating mode selected in step 1215. Step 1217 is optional and is used to adjust excitation current to move the operating point closer to the optimum value selected in step 1215 while ensuring the output voltage remains well below the operating DC bus voltage. Once the selected engine is deactivated by idling or turning it off (with or without the lubricating oil circulating), then the algorithm returns to the main flow control chart 1218.

Figure 13:
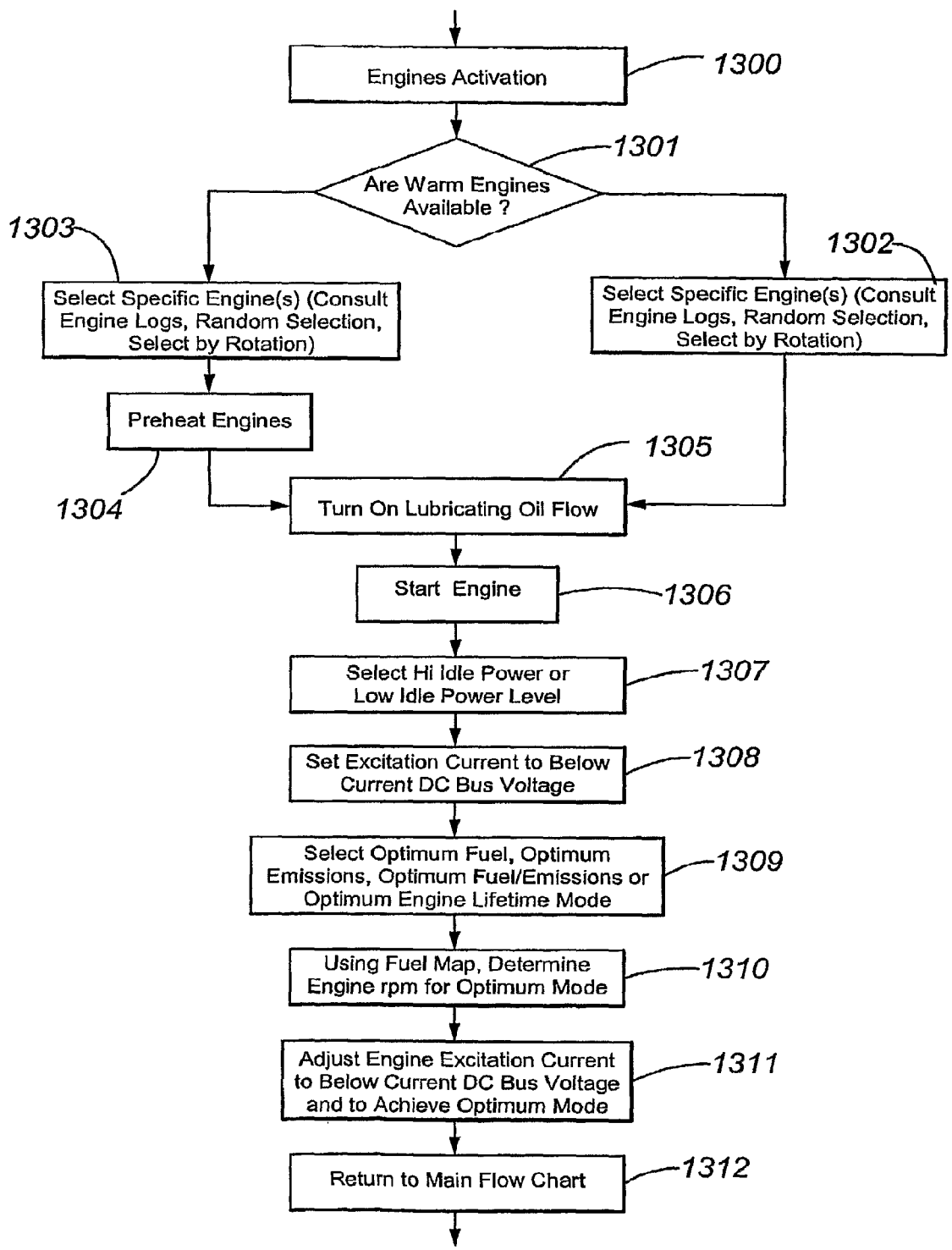
FIG. 13 is an example of a flow chart for activating an engine.

FIG. 13 is an example of a flow chart for controlling activating an engine 1300. The first step 1301 is to determine if warm engines are available. In either case, the algorithm that selects the engines may consider the operating history of the engines, as indicated by step 1302 or 1303, so as to avoid using some engines more than others and thereby approximately balancing the usage and maintenance period of the engines. Although less preferable than consulting an engine log, the selection algorithm may be engine selection by random number between one and the number of available engines, which, over time, should tend to even out engine usage. The selection algorithm may be engine selection by rotation to the next engine in an engine sequence which, over time, should also tend to even out engine usage. If there are no warm engines available, then the selected engine is preheated 1304. Thereafter, the lubricating oil flow for the selected engine is turned on 1305. The selected engine is then started 1306 and set to one of the available idle settings 1307 as selected by the engineer. The next step 1308 is to set engine alternator excitation current so that the alternator output voltage is sufficiently below the currently selected DC bus voltage. The next step 1309 is to determine the desired operating mode. Examples of operating modes include a maximum fuel efficiency mode, a minimum emissions mode, a combination mode of good fuel efficiency and low emissions and an optimum engine lifetime mode. The next step 1310 is to use the engine's fuel map to determine the engine idle rpms to achieve the operating mode selected in step 1309. Step 1311 is optional and is used to adjust excitation current to move the operating point closer to the optimum value selected in step 1309 while ensuring the output voltage remains well below the operating DC bus voltage. Once the selected engine is activated, then the algorithm returns to the main flow control chart 1312.

The following is a description of a more elaborate location-based multi-engine control automated computer-controlled engine operating cycle for a multi-engine locomotive, otherwise it is similar to the basic operating cycle described in FIG. 7. An automated cycle may include the steps of (1) determining the train's location along its route at the time in question (this capability can be provided by, for example, a Global Positioning System ("GPS") device, a radio, a cell phone or by a transponder or mechanical locator situated along the track); (20 determining the speed of the locomotive (for a given notch power setting, this determination allows the tractive effort, traction motor power, traction motor rpms, traction motor back emf, traction motor volts and traction motor current to be computed. If the locomotive is idling and at rest, this step is trivial); (3) determining the zone that the train is located in along its route (this can be done, for example, by using the train's determined location and an on-board computer containing a detailed physical map of the train route and route requirements, to determine when the locomotive is in a zone where any of a number of emissions, noise restrictions and speed restrictions must be observed or where certain locomotive performance is required. An example of the latter may be high acceleration such as, for example, exiting a station); (4) determining the location of the locomotive consist member in the train (typically from the train location device in the lead locomotive and from the knowledge of the number of cars that the consist member is removed from the lead locomotive. If there is only one locomotive, this step is trivial. In a long train where consist members may be at various locations, this step is included since consist members can be located in different operating zones); and (5) looking ahead to project energy, emissions, noise and power requirements of the lead locomotive and all consist members for each section or zone of the train's up and coming route.

Figure 14:
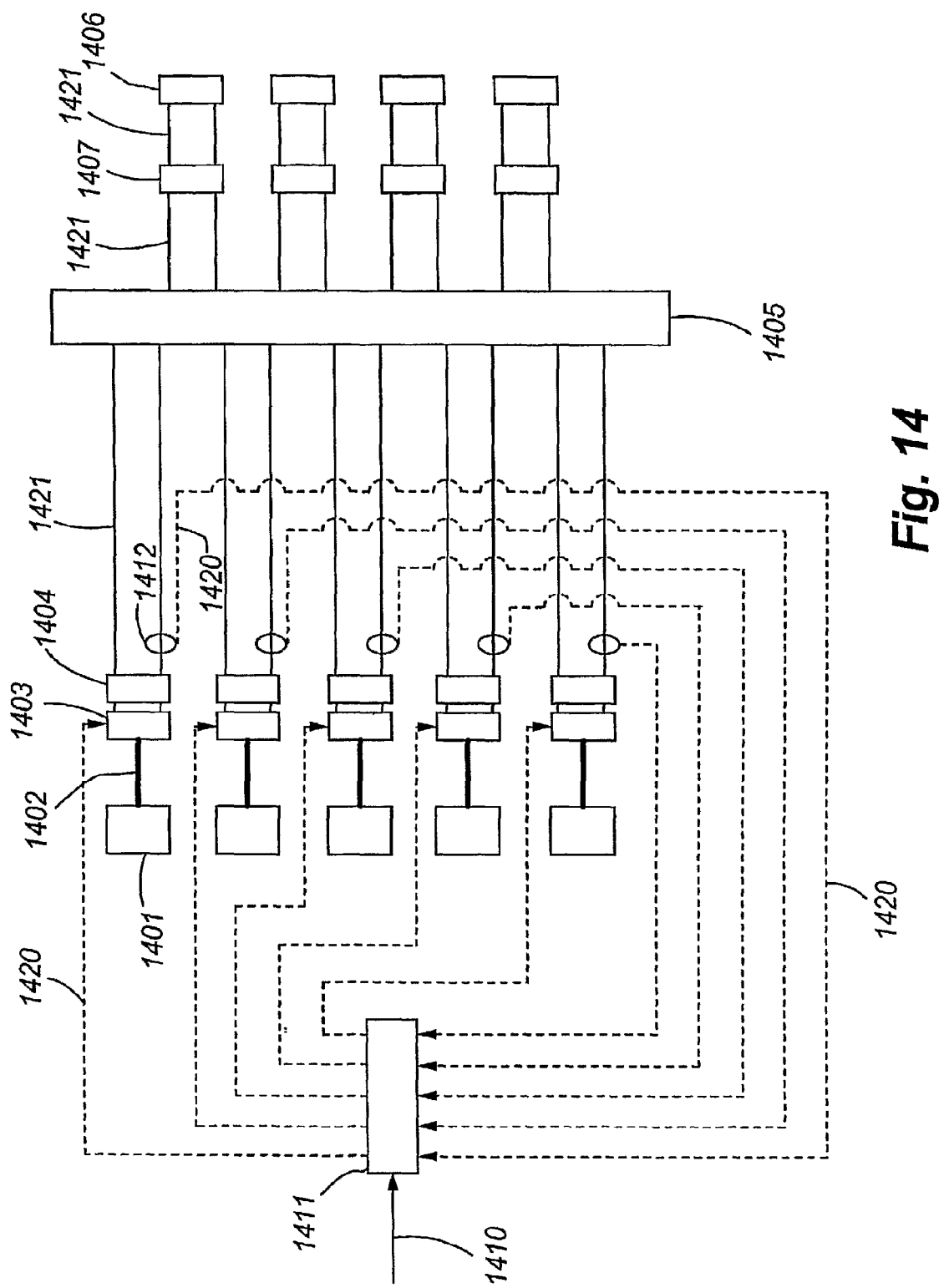
FIG. 14 is a schematic of a multi-engine current-based control feedback system.

FIG. 14 is a schematic of a possible embodiment of multi-engine current-based control feedback system. This schematic shows five engines 1401, each connected by mechanical shafts 1402 to corresponding alternators 1403. Rectifiers 1404 are electrically connected to the outputs of alternators 1403 to provide DC power to a common DC bus 1405. In this embodiment, the output of the DC bus 1405 provides power to four traction motors 1406, each shown with load control apparatuses 1407. The electrical outputs of the alternator/rectifiers are connected in parallel with the DC bus 1405. The load controlled traction motors are also shown connected in parallel with the DC bus 1405. This figure illustrates a preferred engine balancing control feedback loop. An input command 1410 (for example a selected power level for a selected engine operating mode) is issued to a controller 1411. The output currents from each engines's alternator/rectifier are measured by current sensors 1412 which are monitored by the controller 1411. The controller 1411 then uses the measured currents in a control feedback loop to modify each engine's alternator 1403 excitation current or alternator voltage boost to bring each engine's power contribution into balance with its pro rata portion of the total power to the DC bus. The control feedback loop is typically one of a number of well-known proportional integral differential ("PID") control algorithms. The dotted lines 1420 represent current feedback control circuit connections while the solid lines 1421 represent power distribution circuit connections. As can be appreciated, the control feedback system can also be applied to a locomotive with a single traction motor connected to an axle drive system typical of a diesel-hydraulic locomotive. As can further be appreciated, the control feedback system can also be applied such that the measured currents in a control feedback loop to modify each engine's speed (for example by changing its fuel flow rate) to bring each engine's power contribution into balance with its pro rata portion of the total power to the DC bus. This feedback control configuration is less preferable because (1) it is preferred to maintain the engine speed and power output at its optimum operating mode set point and (2) the mechanical inertia of changing engine speeds tends to make the feedback less responsive.

As can be appreciated, it is possible to use the measured alternator/rectifier currents to adjust or modify a combination of engine speed, engine alternator excitation current and, if available, alternator voltage boost to balance the power outputs of all the engines to the DC bus.

Method Applied to Fuel Cells

The present method of multi-engine control can be readily adapted to a vehicle which is based on fuel cells, rather than on internal combustion engines such as for example diesel engines. As can be appreciated, the locomotive can be comprised of a combination of engines and fuel cells (both of which are prime power sources). A fuel cell power system is commonly comprised of a fuel cell stack and associated equipment such as heat exchangers, blowers, pumps, dehumidifiers and the like. The inputs to the fuel cell are a regulated sources of hydrogen and air. The output of the fuel cell is an unregulated DC voltage and current and emissions consisting principally of water and heat. The output voltage and power of a fuel cell is dependent on, for example, the amount of hydrogen and air, the input pressure and temperature of the hydrogen and air and the output electrical current. The higher the output current, the lower the fuel cell efficiency because of internal fuel cell $I^2R$ resistance losses. Thus a buck/boost circuit or other form of voltage regulation circuit is required to stabilize the voltage from the output of a fuel cell to a DC bus.

As can be appreciated, a fuel cell power system is analogous to a diesel engine power system. A fuel cell power plant is functionally similar to a diesel engine power plant and a voltage regulation circuit is functionally similar to an alternator. When multiple fuel cell systems are used, their respective voltage regulation circuits, such as for example a buck/boost circuits, are controlled to provide the output voltage level of the fuel cell system so as to provide the desired amount of power to a DC bus. Thus the control system for a multi-fuel cell locomotive based on measuring the output current from the fuel cell system and using a controller to adjust a mechanical parameter of the fuel cell power plant or an electrical parameter of the voltage regulation circuit. Examples of mechanical parameter of the fuel cell power plant are the rate of hydrogen injection, rate of air injection, the pressure of the hydrogen, the pressure of the air and the amount of supercharging used. Examples of electrical parameters of the voltage regulation circuit are the duty cycles of the choppers used to control either the step-up or step-down voltage level.

As with a diesel engine, a fuel cell can be operated in different modes. These would include, for example, a high power mode, an idling mode, a maximum fuel efficiency mode and an optimized lifetime mode. These modes may be specified and applied by specifying an operating point on a fuel cell performance chart such as shown in FIG. 15.

Figure 15:
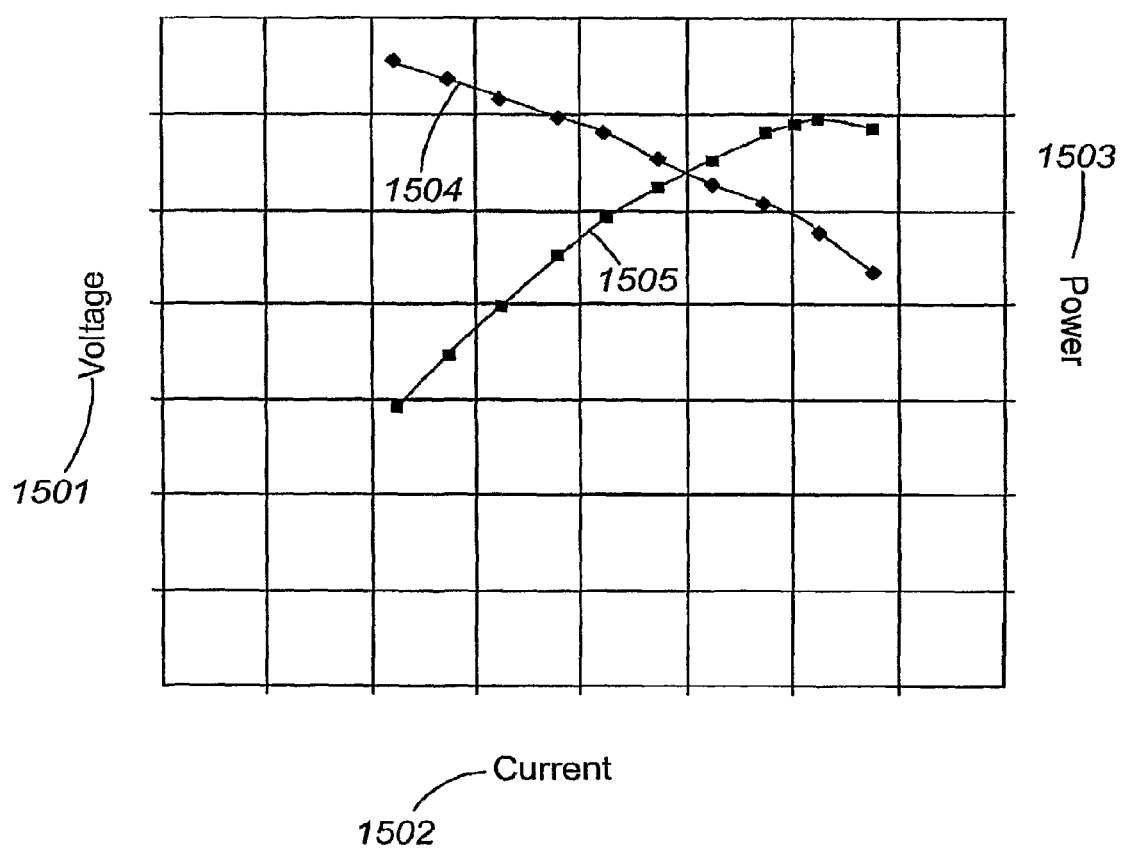
FIG. 15 is a voltage-current diagram for a fuel cell.

FIG. 15 illustrates a typical voltage-current plot for a fuel cell with voltage 1501 on the left-side y-axis and current 1502 on the x-axis. Power 1503 is shown along the right-side y-axis. The volt-ampere curve 1504 illustrates that output voltage drops as output current is increased. The power-ampere curve 1505 shows how power increases to a maximum and then declines with a further increase in output current. As can be seen from FIG. 15, power can be traded off for higher operating efficiency. Fuel cell efficiency is typically high (in the range of about 70% to 80% when current is low) and decreases with increasing output current. The curves shown in FIG. 15 are for a constant fuel injection pressure. Thus a fuel cell efficiency map can be constructed by measuring output voltages and their corresponding output currents for different fuel injection pressures.

The output power range for fuel cell power plants can be in the range of about 50 kW to 1,000 kW and therefore a locomotive power system can be comprised of several internal combustion engines, several fuel cell power plants or a combination of internal combustion engines and fuel cell power plants (typically a total number of prime power systems in the range of 2 to about 10). The general control system for any of these is the same. Measure the current output of each power plant system to a common DC bus operated at a selected voltage. Utilize the measured power (output current times DC bus voltage) power to adjust either or both of a mechanical parameter of the power plant and an electrical parameter of the energy conversion device to obtain the desired power output in the desired operating mode.

Alternator Boost

Figure 16:
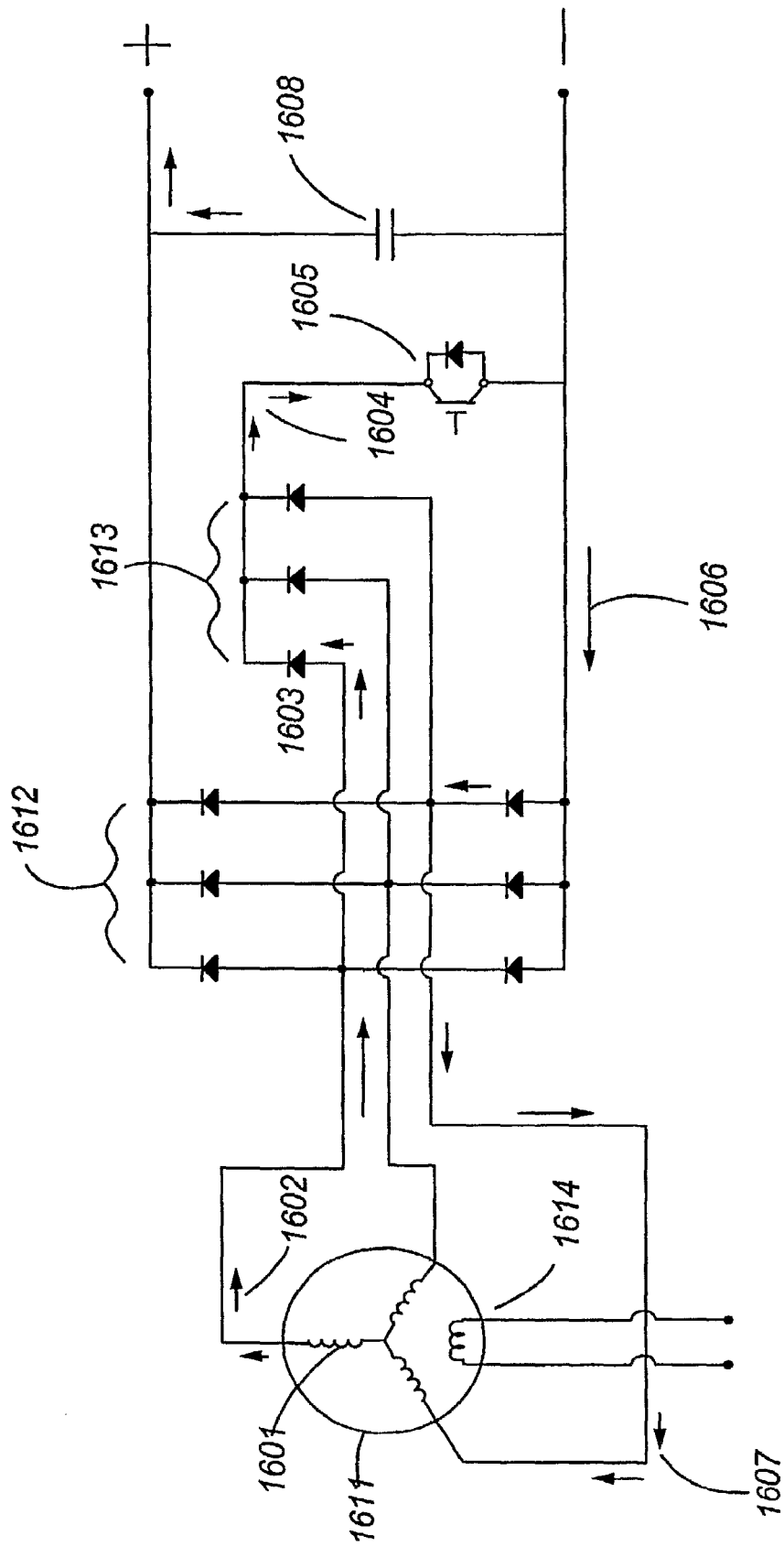
FIG. 16 is a schematic circuit of an alternator and rectifier circuit of the present invention showing a boost circuit with its IGBT in conducting mode.

FIG. 16 is a schematic circuit of an alternator and rectifier circuit of the present invention. The shaft power of a diesel, gas turbine or other type of engine turns an alternator rotor assembly 1611 whose field coils cause armature coils 1601 in the stator to generate an alternating current which is rectified by power diodes 1612. The rectified power is then delivered to a load such as a DC bus. The output of the armature coils 1601 is modulated by an independently controlled exciter coil 1614. The circuit of FIG. 16 includes an additional set of three power diodes 1613, an IGBT 1605 and a capacitor 1606 which together form a voltage boost circuit for each combination of the three armature coils 1601. At any instant, a pair of armature coils 1601 which are conducting current constitute a voltage source and an inductance in a voltage boost circuit which includes one of the three diodes 1613, the IGBT 1605 and capacitor 1606.

In the examples used herein, the alternator is taken to be a 3-phase alternator and the engine output shaft is taken to be directly connected to the rotor of the alternator (so engine rpms and alternator rpms are the same in the examples discussed herein). As can be appreciated, the alternator can be a 2-phase or n-phase machine but is typically a 3-phase machine when used with large diesel engines such as used on diesel-electric locomotives, for example. As can also be appreciated, the engine output shaft can be geared up or down to couple with the alternator rotor. However, in most diesel-electric locomotives, the engine output shaft is directly connected to the rotor of the alternator.

When the engine is operating at high rpm, there is no need to boost the output voltage of the alternator/rectifier. However, when the engine is operating at low rpm, the exciter circuit cannot sufficiently compensate to provide the required level of output voltage. At low rpm, for example at 1,000 rpm (where the preferred operating rpm level of the alternator is in the range of about 1,700 to about 1,900 rpm), the output frequency of each armature coil is about 33 Hz. A power IGBT can operate at on/off frequencies of about 1,000 Hz and so can provide the requisite pumping action to boost the output voltage of each armature coil.

One of the principal features of the present invention is that the inductance of the alternator armature coils is in the correct range for effective voltage boost for the range of alternator operating frequencies and the available IGBT switching duty cycles.

FIG. 16 also shows the present invention acting as a boost circuit with its IGBT in conducting mode. In this example, armature coils 1601 have a positive voltage and generate current 1602 which is short circuited through diode 1603 along path 1604 by the conducting IGBT 1605 and returns via path 1606 and, in this example, through the armature coil that lags by 240 degrees via path 1607. Thus, electrical energy is being stored in armature coils 1601. Meanwhile, capacitor 1608 is discharging through the output terminals to the load (not shown). Armature coils 1601, diode 1603, IGBT 1605 and capacitor 1608 form a voltage boost circuit. As the rotor turns, each pair of armature coils and a corresponding diode form a voltage boost circuit with IGBT 1605 and capacitor 1608. In this way, the net voltage output across the load terminals is increased over that of an alternator without the added circuitry of the present invention. A feature of the present invention is the requirement for only one additional IGBT to a prior art circuit.

Figure 17:
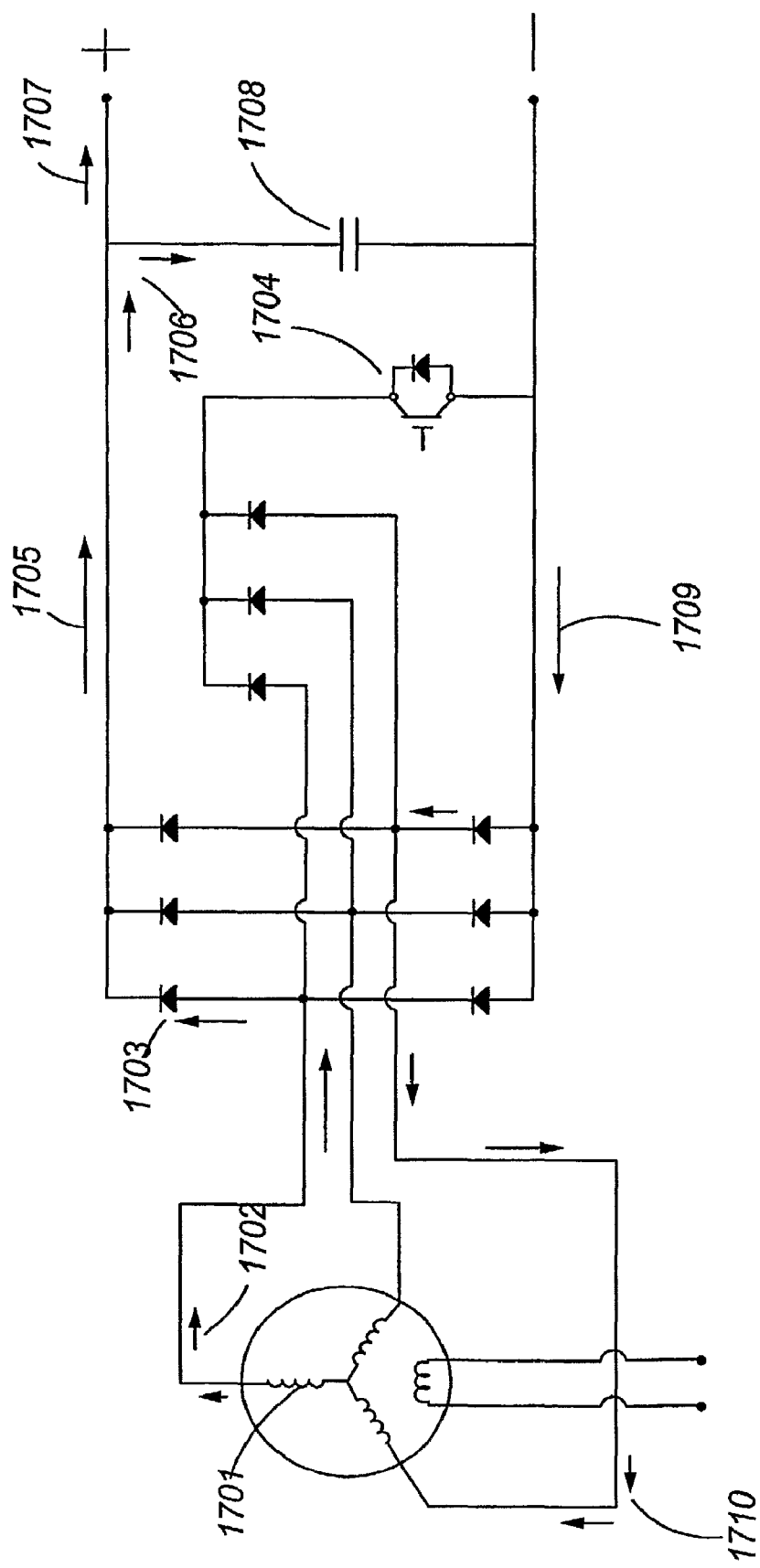
FIG. 17 is a schematic circuit of an alternator and rectifier circuit of the present invention showing a boost circuit with its IGBT in non-conducting mode.

FIG. 17 is a schematic circuit of an alternator and rectifier circuit of the present invention showing a boost circuit with its IGBT in non-conducting mode. In this example, which is similar to that of FIG. 16 armature coils 170 continue to have a positive voltage and to generate current 1702. However, IGBT 1704 is now switched off and is non-conducting. Current now flows through diode 1703 and along path 1705. From there, the current flows into capacitor 1708 via path 1706 and to the load via path 1707. Current returns via path 1709 and, in this example, through the armature coil that lags by 240 degrees via path 1710. Thus, energy is being delivered from armature coils 1701 and applied to both charging capacitor 1708 and supplying power to the load (not shown) through the output terminals.

Thus the output voltage of the alternator/rectifier of the present invention can be varied independently of engine speed by using either or both the excitation current and the voltage boost circuit. At high engine speeds (e.g., a speed above a first threshold), the excitation current circuit can be used to regulate output voltage. At intermediate engine speeds (e.g., a speed between the first and a second threshold), both the excitation current circuit and the boost circuit can be used to regulate output voltage. At low engine speeds (e.g., a speed below the second threshold), the boost circuit can be used to regulate output voltage. The amount of boost provided is controlled by the duty cycle of the IGBT.

A number of variations and modifications of the invention can be used. As will be appreciated, it would be possible to provide for some features of the invention without providing others. For example, in one alternative embodiment, the various inventive features are applied to vehicles other than locomotives, such as cars, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present inventor, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A propulsion system, comprising:
   (a) a plurality of prime power systems, each prime power system comprising;
      a prime power source device; and
      an energy conversion device operable to convert energy output by the prime power device into direct current electrical energy;
   (b) a direct current bus connecting the plurality of prime power systems, the direct current bus being operable to carry the direct current electrical energy to and/or from the prime power systems;
   (c) a voltage sensor for measuring a voltage level across the direct current bus;
   (d) a plurality of current sensors, each current sensor measuring a direct current electrical energy outputted by a selected prime power system; and
   (e) a control system operable, based on the measured voltage level across the direct current bus and the respective measured direct current electrical energy into and/or out of each prime power system, to control at least one of:
      (i) a mechanical parameter of the selected prime power system;
      (ii) an electrical parameter of the selected prime power system; and
      (iii) an electrical parameter of the direct current bus.

2. The propulsion system of claim 1 wherein the prime power system is an engine and the energy conversion device is a mechanical-to-electrical energy conversion device operable to convert mechanical energy output by the engine into direct current electrical energy.

3. The propulsion system of claim 2 wherein the control system controls (i) and wherein the mechanical parameter is at least one of a mechanical power setting of the selected engine, a mechanical rotary speed setting of the selected engine and a fuel supply to the selected engine.

4. The propulsion system of claim 2, wherein the control system controls an engine power and/or rotary speed operating point to the selected engine.

5. The propulsion system of claim 2, wherein the plurality of mechanical-to-electrical energy conversion devices are connected in parallel to the bus, wherein the control system controls (ii), wherein the output electrical parameter is at least one of an output electrical voltage, an output electrical current and output electrical power of the selected engine system, wherein the mechanical-to-electrical energy conversion devices comprise an electrical converter operable to inhibit reverse flow of direct current electrical energy from the bus to a selected engine system and further comprising:
   a control device for providing at least one of a rotary speed, a winding configuration and a magnetic flux modification to a selected mechanical-to-electrical energy conversion device to vary an output voltage of the selected mechanical-to-electrical energy conversion device.

6. The propulsion system of claim 2, wherein the control system controls (ii) and wherein the electrical parameter is at least one of an output electrical voltage, an output electrical current and output electrical power and further comprising:
   a voltage boost circuit for the selected engine electrically connected with each armature of an alternator corresponding to the selected engine to boost the voltage generated by each armature, wherein the armature of the alternator acts as an inductor in the voltage boost circuit.

7. The propulsion system of claim 1 wherein the prime power system is a fuel cell and the energy conversion device is an electrical converter device.

8. The propulsion system of claim 7 wherein the control system controls (i) and wherein the mechanical parameter is at least one of a mechanical flow rate of a fuel component of the selected fuel cell and mechanical fuel pressure level of a fuel component of the selected fuel cell.

9. The propulsion system of claim 7, wherein the control system controls a fuel cell electrical power and/or electrical current operating point of the selected fuel cell.

10. The propulsion system of claim 7, wherein the plurality of electrical converter devices are connected in parallel to the bus, wherein the control system controls (ii), wherein the electrical parameter is at least one of an output electrical voltage, an output electrical current and output electrical power of the selected fuel cell system, and further comprising:

an electrical circuit operable to inhibit reverse flow of direct current electrical energy from the bus to a selected fuel cell system; and
a controller for providing at least one of a voltage regulation, a voltage increase and a voltage reduction function to a selected electrical converter device to maintain a selected output voltage of the selected electrical converter device.

11. The propulsion system of claim 1, wherein the control system controls (iii) and wherein the electrical parameter of the direct current bus is at least one of a voltage level across the bus and a total electrical power carried by the bus and further comprising:
a power control device positioned between the bus and at least one load device.

12. The propulsion system of claim 1, wherein the control system varies the at least one of (i), (ii), and (iii) for a set of two or more of the prime power systems, wherein the control system selects at least one desired operating point for the set of prime power systems and/or for a prime power system in the set, determines a corresponding power output for a selected prime power system in the set based on the desired operating point, and controls the at least one of (i), (ii), and (iii) for the selected prime power system based on the corresponding power output, wherein each prime power system in the set has a corresponding desired operating point, wherein the desired operating point is associated with at least one of a desired fuel consumption rate, an emissions level rate of at least one target emission component, a desired prime power system power output, and a desired prime power system lifetime, and wherein the desired operating point is associated with an emissions level rate of at least one target emission component and the at least one target emission component is at least one of a compound of nitrogen and oxygen and a compound of carbon and oxygen.

13. A propulsion system, comprising:
(a) an engine system comprising;
an engine; and
an n-phase alternator operable to convert mechanical energy output by the engine into alternating current electrical energy, each phase corresponding to an armature winding;
(b) at least one traction motor in electrical communication with the alternator;
(c) a voltage boost circuit electrically connected with each of the n-armature windings of the alternator to boost the output voltage associated with each armature winding, wherein each armature winding provides an inductance for the voltage boost circuit.

14. The propulsion system of claim 13, further comprising:
a rectifying diode network in electrical communication with the alternator to convert the outputted alternating current electrical energy into direct current electrical energy; and wherein the voltage boost circuit comprises:
an IGBT switch, a capacitor and n-diodes in electrical communication with the alternator and rectifying diode network; and
a control system operable, based on a measured mechanical or electrical parameter of the alternator, to control the switching rate of the IGBT such that the IGBT, the capacitor, and the n-diodes form a variable voltage boost circuit with each of the n-armature coils of the alternator during the corresponding power phase of the nth armature coil, whereby the output voltage of the engine system can be varied independently of engine speed.

15. The system of claim 13, wherein the voltage boost circuit does not boost the voltage when a revolutions-per-minute of the engine is greater than a first threshold and boosts the voltage when the revolutions-per-minute of the engine is less than the first threshold.

16. A propulsion method, comprising:
(a) in a first mode in which a switch is conducting, directing an output electrical current of an n-phase alternator along a first path through a first set of diodes, through the switch, and back to an armature coil of the alternator, thereby storing electrical energy in the armature coil; and
(b) in a second mode in which the switch is nonconducting, directing the output electrical current along a second path through a second set of diodes to a load, wherein the second path bypasses the switch.

17. The method of claim 16, wherein the armature comprises n-armature coils, each armature coil being in the first mode at a different time, wherein a control system, based on a measured mechanical or electrical parameter of the alternator, controls the on-off duty cycle of the switch between the first and second modes such that the switch, the capacitor, and the first set of diodes form a variable voltage boost circuit with each of the n-annature coils of the alternator during the corresponding first mode of the nth armature coil, whereby the output voltage of the engine system can be varied independently of engine speed.

18. In a multi-prime power source vehicle, a propulsion method, comprising:
(a) determining an operating voltage range for a direct current electrical bus;
(b) determining a power requirement to be provided to the direct current electrical bus by a plurality of prime power systems;
(c) selecting at least a subset of the prime power systems to provide the determined power requirement to the direct current electrical bus;
(d) determining a first magnitude of an operational parameter for each of the selected prime power systems to provide, to the direct current electrical bus, the selected prime power system's portion of the determined power requirement;
(e) setting each of the selected prime power systems to the corresponding first magnitude of the determined operational parameter to provide the selected prime power system's portion of the determined power requirement to the direct current electrical bus;
(f) measuring an electrical parameter of each of the selected prime power systems;
(g) comparing the measured electrical parameter of each of the selected prime power systems to the corresponding portion of the determined power requirement; and
(h) if needed, adjusting at least one of (i) the first magnitude of the operational parameter of the selected prime power system and (ii) the electrical parameter of the selected prime power system to produce the corresponding required electrical power output for the selected prime power system.

19. The method of claim 18, wherein each prime power system comprises at least one of an engine and a fuel cell and further comprising:
adjusting power to a load attached to the direct current electrical bus.

20. The method of claim 19, wherein a power requirement to be provided to the direct current electrical bus by a plurality of prime power systems is modified by adjusting power to a load attached to the direct current electrical bus.

21. The method of claim 18, wherein the power requirement is based on a physical location of the prime power systems as sensed by an on board position tracking system, wherein an electrical power outputted by the selected prime power system is proportional to a current outputted by the selected prime power system, wherein step (f) is performed by measuring electrical power outputted by each of the at least a subset of prime power systems and wherein, in step (g), the measured current is compared to a corresponding required current for the selected prime power system.

22. The method of claim 18, wherein step (h) is performed by at least one of the following:
(i) adjusting an output voltage of each of the selected prime power system; and
(ii) adjusting a power outputted by the prime power source.

23. A propulsion method in a multi-prime power source vehicle, comprising:
(a) determining an operating voltage range for a direct current electrical bus;
(b) determining a power requirement to be provided to the direct current electrical bus by a plurality of prime power systems;
(c) selecting a prime power source operating mode from among a plurality of differing prime power source operating modes;
(d) based on the determined power requirement and selected prime power source operating mode, selecting at least a subset of the prime power systems to provide the determined power requirement to the direct current electrical bus; and
(e) based on the determined power requirement and selected prime power source operating mode, setting at least one of (i) an operational mechanical parameter for each of the selected prime power systems and (ii) an operational electrical parameter for each of the selected prime power systems, to provide the selected prime power system's portion of the determined power requirement to the direct current electrical bus.

24. The method of claim 23, wherein each prime power system comprises at least one of an engine and a fuel cell and wherein the setting step (e) comprises the substep of setting an operational mechanical parameter and wherein the operational mechanical parameter is at least one of an output mechanical power of the selected prime power system, an output mechanical rotary speed of the selected prime power system, an operating pressure level of the selected prime power system, and an input prime power source operating point to the selected prime power system.

25. The method of claim 23, wherein the setting step comprises controlling an input fuel supply to the selected prime power system.

26. The method of claim 23, wherein each member of the subset of prime power systems is connected in parallel to the bus, wherein the setting step (e) comprises the substep of setting an operational electrical output parameter, wherein the output parameter is at least one of an output electrical voltage, an output electrical current and an output electrical power of the selected prime power system, wherein an electrical converter comprises an electrical circuit operable to inhibit reverse flow of direct electrical energy from the bus to a selected prime power system and further comprising:
providing a control electrical signal to a selected electrical converter device to maintain an output voltage of the selected electrical converter device within a selected range.

27. The method of claim 23, wherein the prime power source comprises an engine operatively engaged with an alternator and in the setting step (e), the electrical parameter is set and wherein the electrical parameter is at least one of an output electrical voltage, an output electrical current and output electrical power and further comprising:
boosting an output voltage of a selected engine system using a voltage boost circuit, the voltage boost circuit being electrically connected with each armature of the alternator corresponding to the selected engine to boost the voltage generated by each armature, wherein the armature of the alternator acts as an inductor in the voltage boost circuit.

28. The method of claim 23, wherein, in the setting step (e), the electrical parameter is set and wherein the electrical parameter of the direct current bus is at least one of a voltage level across the bus and a total electrical power of the bus and further comprising:
controlling a power level supplied to a load device using a power control device positioned between the bus and the load device.

29. The method of claim 23, further comprising:
selecting a desired operating point for the plurality of prime power systems;
determining, for each of the prime power systems, the corresponding power requirement based on the corresponding desired operating point; and
controlling at least one of a mechanical parameter and an electrical parameter for each of the each of prime power systems based on the corresponding power output.

30. The method of claim 29, wherein the desired operating point is associated with at least one of a desired fuel consumption rate, an emissions level rate of at least one target emission component substance, a desired prime power system power output, and a desired prime power source lifetime, wherein the desired operating point is associated with an emissions level rate of at least one target emission component substance and the at least one target emission component substance is at least one of a compound of nitrogen and oxygen and a compound of carbon and oxygen.

31. The method of claim 29, wherein the desired operating point is associated with a desired fuel consumption.

32. The method of claim 23, wherein the operating modes are at least two of the following: an emissions mode in which prime power system emission of a selected substance is less than a specified level, a prime power lifetime mode in which prime power system power output is maintained below a specified level to provide for increased prime power system operating life, a maximum fuel efficiency mode in which prime power system power output is maintained below a specified level to provide for at least a selected level of fuel consumption, a noise emissions mode in which prime power system noise emissions are maintained less than a specified level, and a maximum power mode in which prime power system power output is substantially maximized, wherein first and second prime power systems are simultaneously in differing operating modes.

33. The method of claim 23, wherein the selection of the operating mode is based on a physical location of the prime power system as determined by an on board location tracking system.

34. The method of claim 23, wherein subset of prime power systems is selected based upon at least one of an operating history of each prime power system, a random number generator output value, a pseudo-random number generator output value, and a round robin scheduler value.

35. A propulsion system, comprising:
(a) a plurality of engine systems, each engine system comprising;

an engine;
an induction alternator operable to convert mechanical energy output by the engine into alternating current electrical energy;
an electrical converter operable to convert the outputted alternating current electrical energy into direct current electrical energy and to permit electrical energy to flow reversably in each of two directions; and
(b) a direct current bus connecting the plurality of engine systems, the direct current bus being operable to carry the direct current electrical energy to and/or from the engine systems, wherein, at a selected time, at least a first engine system is turned off and at least a second engine system is turned on, wherein the electrical converter of the second engine is switched to provide electrical energy to the DC bus at a selected voltage level, and the electrical converter of the first engine is switched to receive electrical energy from the DC bus at a selected voltage level, whereby the first engine is activated using electrical energy supplied, via the DC bus, by the second engine.

36. A propulsion system, comprising:
(a) a plurality of engine systems, each engine system comprising;
an engine;
one or more energy storage systems;
an induction alternator operable to convert mechanical energy output by the engine into alternating current electrical energy;
an electrical converter circuit operable to convert the outputted alternating current electrical energy into direct current electrical energy and to permit electrical energy to flow reversably in each of two directions; and
(b) a direct current bus connecting the plurality of engine systems, the one or more energy storage systems, the direct current bus being operable to carry the direct current electrical energy to and/or from the engine systems and the one or more energy storage systems, wherein, at a selected time, at least a first engine system is turned off and at least a second engine system or an energy storage system is turned on, wherein the electrical converter of the second engine or energy storage system is switched to provide electrical energy to the DC bus at a selected voltage level, and the electrical converter of the first engine is switched to receive electrical energy from the DC bus at a selected voltage level, whereby the first engine is activated using electrical energy supplied, via the DC bus, by the second engine or an energy storage system.

* * * * *